US009098873B2

(12) United States Patent
Geisner et al.

(10) Patent No.: US 9,098,873 B2
(45) Date of Patent: Aug. 4, 2015

(54) MOTION-BASED INTERACTIVE SHOPPING ENVIRONMENT

(75) Inventors: Kevin A. Geisner, Mercer Island, WA (US); Kudo Tsunoda, Seattle, WA (US); Darren Bennett, Seattle, WA (US); Brian S. Murphy, Seattle, WA (US); Stephen G. Latta, Seattle, WA (US); Relja Markovic, Seattle, WA (US); Alex Kipman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 866 days.

(21) Appl. No.: 12/752,917

(22) Filed: Apr. 1, 2010

(65) Prior Publication Data

US 2011/0246329 A1    Oct. 6, 2011

(51) Int. Cl.
| | | |
|---|---|---|
| *G06Q 30/00* | (2012.01) | |
| *G06Q 30/06* | (2012.01) | |
| *G06F 3/01* | (2006.01) | |
| *G06Q 30/02* | (2012.01) | |

(52) U.S. Cl.
CPC ............ *G06Q 30/0643* (2013.01); *G06F 3/017* (2013.01); *G06Q 30/02* (2013.01); *G06Q 30/0641* (2013.01)

(58) Field of Classification Search
CPC   G06Q 30/0643; G06Q 30/0641; G06Q 30/02
USPC ................................................ 705/26.1, 27.1
See application file for complete search history.

(56) References Cited

U.S. PATENT DOCUMENTS

| | | | |
|---|---|---|---|
| 4,627,620 | A | 12/1986 | Yang |
| 4,630,910 | A | 12/1986 | Ross et al. |
| 4,645,458 | A | 2/1987 | Williams |
| 4,695,953 | A | 9/1987 | Blair et al. |
| 4,702,475 | A | 10/1987 | Elstein et al. |
| 4,711,543 | A | 12/1987 | Blair et al. |

(Continued)

FOREIGN PATENT DOCUMENTS

| | | |
|---|---|---|
| CN | 1928908 A | 3/2007 |
| CN | 101254344 B | 6/2010 |

(Continued)

OTHER PUBLICATIONS

"Brave New Cyberworld: The Employer's Legal Guide to the Interactive Internet," by Paul, Richard A. and Chung, Lisa Hird, Computer and Internet Lawyer, vol. 27, Issue 3, pp. 1-20 (Mar. 2010).*

(Continued)

*Primary Examiner* — Anne Georgalas
(74) *Attorney, Agent, or Firm* — Judy Yee; Micky Minhas

(57) ABSTRACT

An on-screen shopping application which reacts to a human target user's motions to provide a shopping experience to the user is provided. A tracking system captures user motions and executes a shopping application allowing a user to manipulate an on-screen representation the user. The on-screen representation has a likeness of the user or another individual and movements of the user in the on-screen interface allows the user to interact with virtual articles that represent real-world articles. User movements which are recognized as article manipulation or transaction control gestures are translated into commands for the shopping application.

18 Claims, 20 Drawing Sheets

(56) References Cited

U.S. PATENT DOCUMENTS

| | | |
|---|---|---|
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,195,104 B1 * | 2/2001 | Lyons ........................... 345/473 |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,901,379 B1 | 5/2005 | Balter et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,062,454 B1 * | 6/2006 | Giannini et al. ........... 705/26.81 |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |

(56) References Cited

U.S. PATENT DOCUMENTS

| | | | |
|---|---|---|---|
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2* | 12/2011 | Marks .......................... 345/632 |
| 2001/0034668 | A1 | 10/2001 | Whitworth |
| 2002/0090985 | A1* | 7/2002 | Tochner et al. .................. 463/1 |
| 2004/0085310 | A1* | 5/2004 | Snuffer ........................ 345/419 |
| 2004/0155962 | A1* | 8/2004 | Marks .......................... 348/169 |
| 2008/0026838 | A1 | 1/2008 | Dunstan et al. |
| 2008/0071559 | A1 | 3/2008 | Arrasvuori |
| 2008/0163344 | A1* | 7/2008 | Yang ................................. 726/4 |
| 2008/0252637 | A1* | 10/2008 | Berndt et al. ................. 345/419 |
| 2009/0158220 | A1* | 6/2009 | Zalewski et al. ............. 715/863 |
| 2009/0163262 | A1* | 6/2009 | Kang ............................... 463/8 |
| 2009/0215533 | A1* | 8/2009 | Zalewski et al. ................ 463/32 |
| 2010/0030578 | A1* | 2/2010 | Siddique et al. ................. 705/3 |

FOREIGN PATENT DOCUMENTS

| | | |
|---|---|---|
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2009026726 A1 | 3/2009 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, Vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Toyama, Kentaro, et al., "Probabilistic Tracking in a Metric Space," Eighth International Conference on Computer Vision, Vancouver, Canada, vol. 2, Jul. 2001, 8 pages.

Jojic, "A Framework for Garment Shopping Over the Internet", to appear in May 1999 in Handbook of Electronic Commerce, edited by Mike Shaw, Springer Verlag.

"Behind an Inspired Room. Or, how I revamped a living room from 793 miles away!", Blog website, InspiredRoomDesign.com, Sep. 15, 2009, Inspired Room Design, LLC, Site by BrightBridge Studios, http://inspiredroomdesign.com/blog.php?post=19.

"Sears Transforms the Online Shopping Experience with Help From IBM and My Virtual Model", Press Release, Mar. 9, 2009, http://www-01.ibm.com/software/success/cssdb.nsf/CS/CPOR-7PW4TU?OpenDocument&Site=default&cty=en_us.

Office Action dated Dec. 4, 2012, in Chinese Patent Appl. No. 201110087429.5 filed Mar. 31, 2011.

Amendment dated Apr. 3, 2013, in Chinese Patent Appl. No. 201110087429.5 filed Mar. 31, 2011.

Office Action Jul. 30, 2013, in Chinese Patent Appl. No. 201110087429.5 filed Mar. 31, 2011.

\* cited by examiner

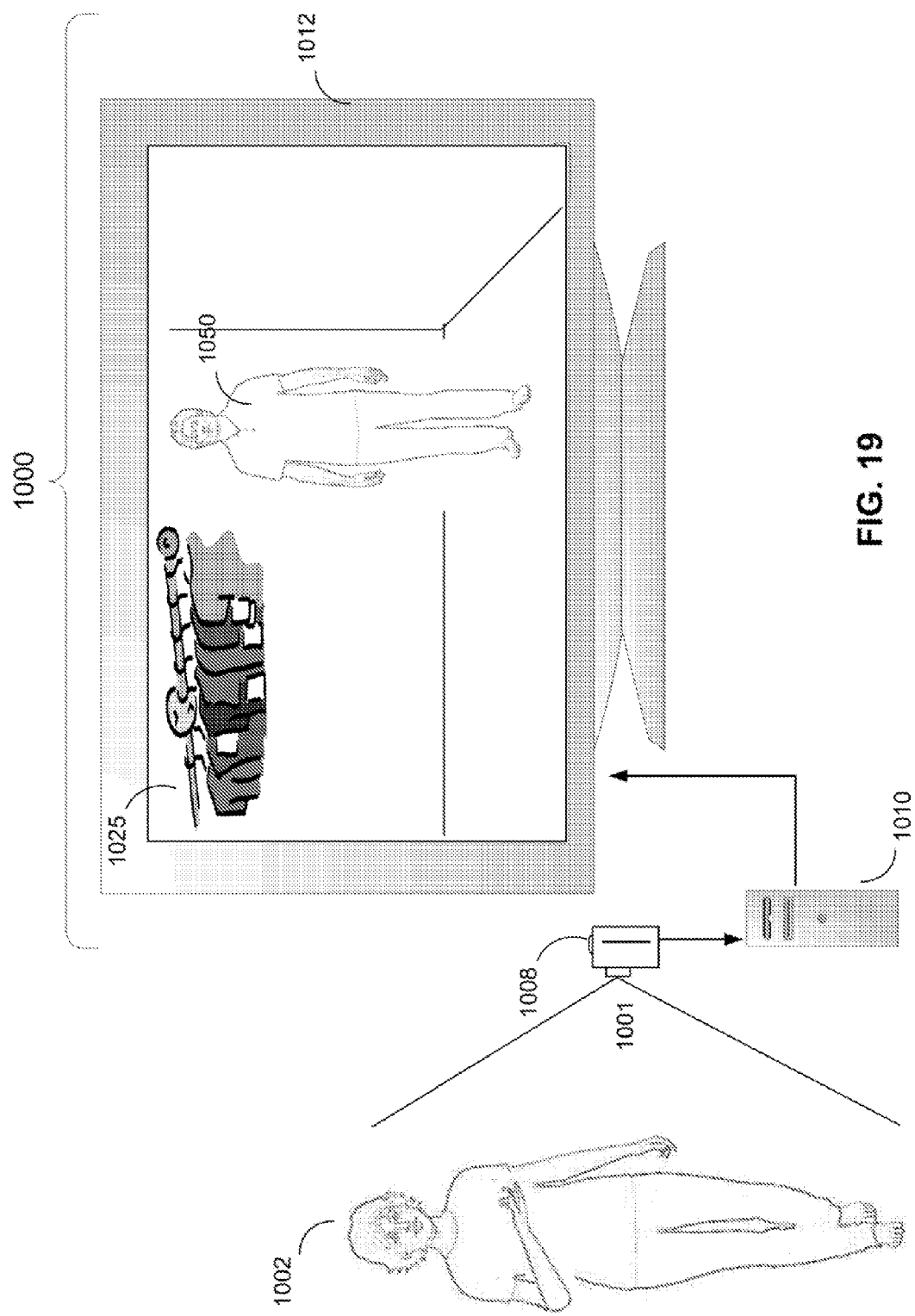

MOTION-BASED INTERACTIVE SHOPPING ENVIRONMENT

BACKGROUND

On-line shopping has become increasingly popular, but suffers from the fact that users may not be aware of how a particular article will work for them. Users may not be aware how an article of clothing fits them or how a piece of furniture will appear in their home. Some attempts to solve this problem include the use of virtual models which are built from a library of stock model parts.

Current solutions to assist a user in determining how articles will work for their particular needs are limited.

SUMMARY

An on-screen shopping application which reacts to a human target user's motions to provide a shopping experience to the user is provided. A tracking system is used to track user motions and execute a shopping application. An on-screen representation of a human target user, representative of the likeness of the user or another individual, is presented on a display device. Movements of the human target user are tracked and displayed on the display device. An on-screen interface allows the user to interact with virtual articles that represent real-world articles available to the user. User movements which are recognized as article manipulation or transaction control gestures are translated into commands for the shopping application.

In one aspect, the application comprises a computer implemented method wherein a scene including a human target user is captured using a capture device which is part of the tracking system. A representation of the scene and the human target is rendered on a display device. An interface is presented allowing the human target to select and position one or more of a plurality of virtual articles representing real articles available for purchase in the representation on the display device. User movements are tracked in the scene and the movements applied to the representation of the human target. Movements are applied to at least one of the virtual articles in the representation when the motions of the human target in the scene indicate an article manipulation gesture. User movements are applied to a purchasing interface when the motions of the human target in the scene indicate an transaction manipulation gesture

BRIEF DESCRIPTION OF THE DRAWINGS

FIG. 19 illustrates a human target user and an on-screen representation of another human target user.

DETAILED DESCRIPTION

Technology is provided wherein a computing system runs an on-screen shopping application which reacts to a human target user's motions to provide a shopping experience to the user. A tracking system is used to track user motions and execute a shopping application. An on-screen representation of a human target user, representative of the likeness of the user or another individual, is presented on a display device. Movements of the human target user are tracked and displayed on the display device. An on-screen interface allows the user to interact with virtual articles that represent real-world articles available to the user. User movements which are recognized as article manipulation or transaction control gestures are translated into commands for the shopping application.

In one embodiment, the shopping solution provided herein utilizes a system 10 which tracks user movements and presents an on-screen representation of a user (and/or other users), and allows interaction by one or more movements of the human target, or tracked, user.

Figure 1A:
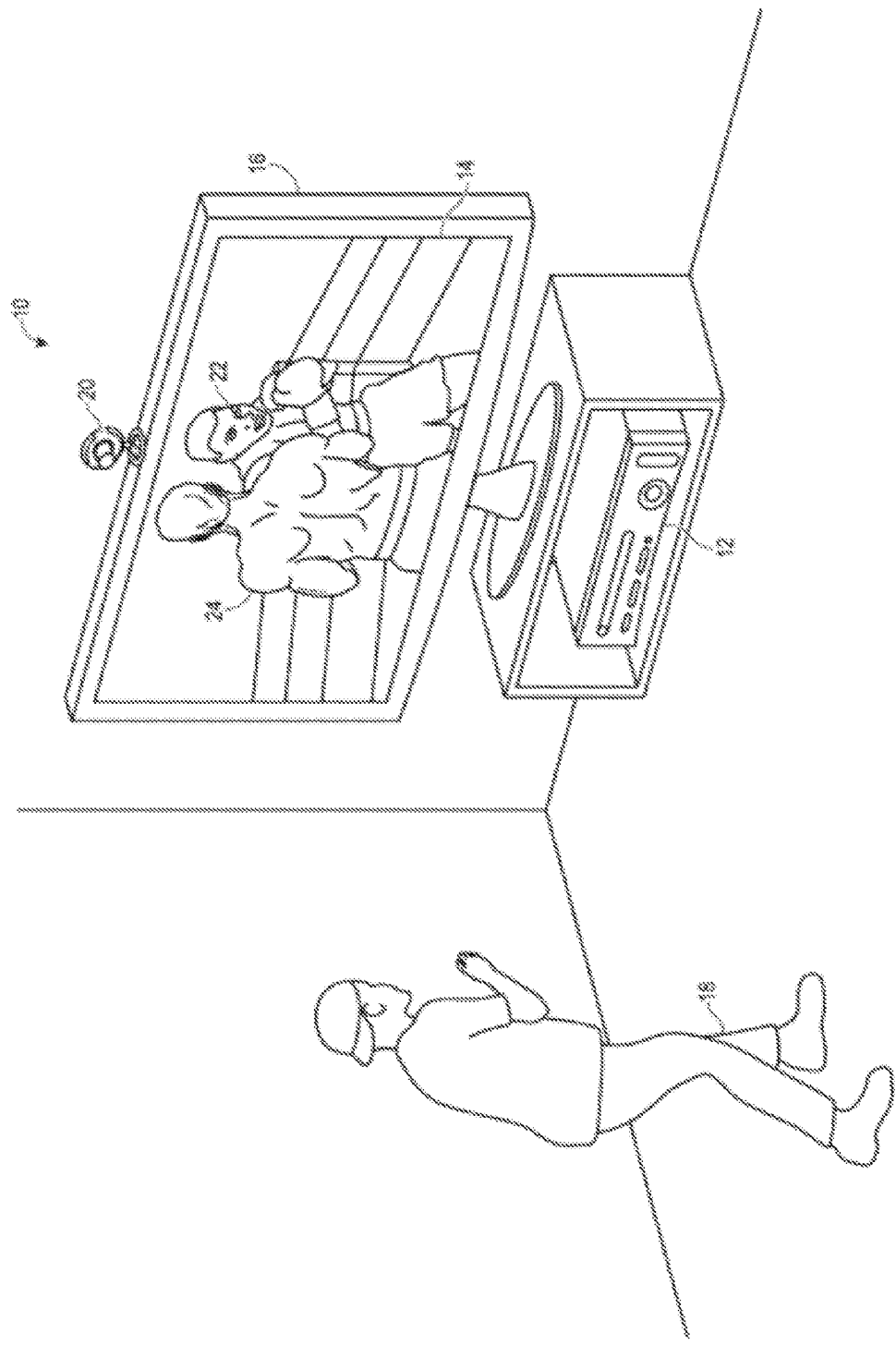
FIGS. 1A and 1B illustrate an example embodiment of a tracking system with a user playing a game.
Figure 1B:
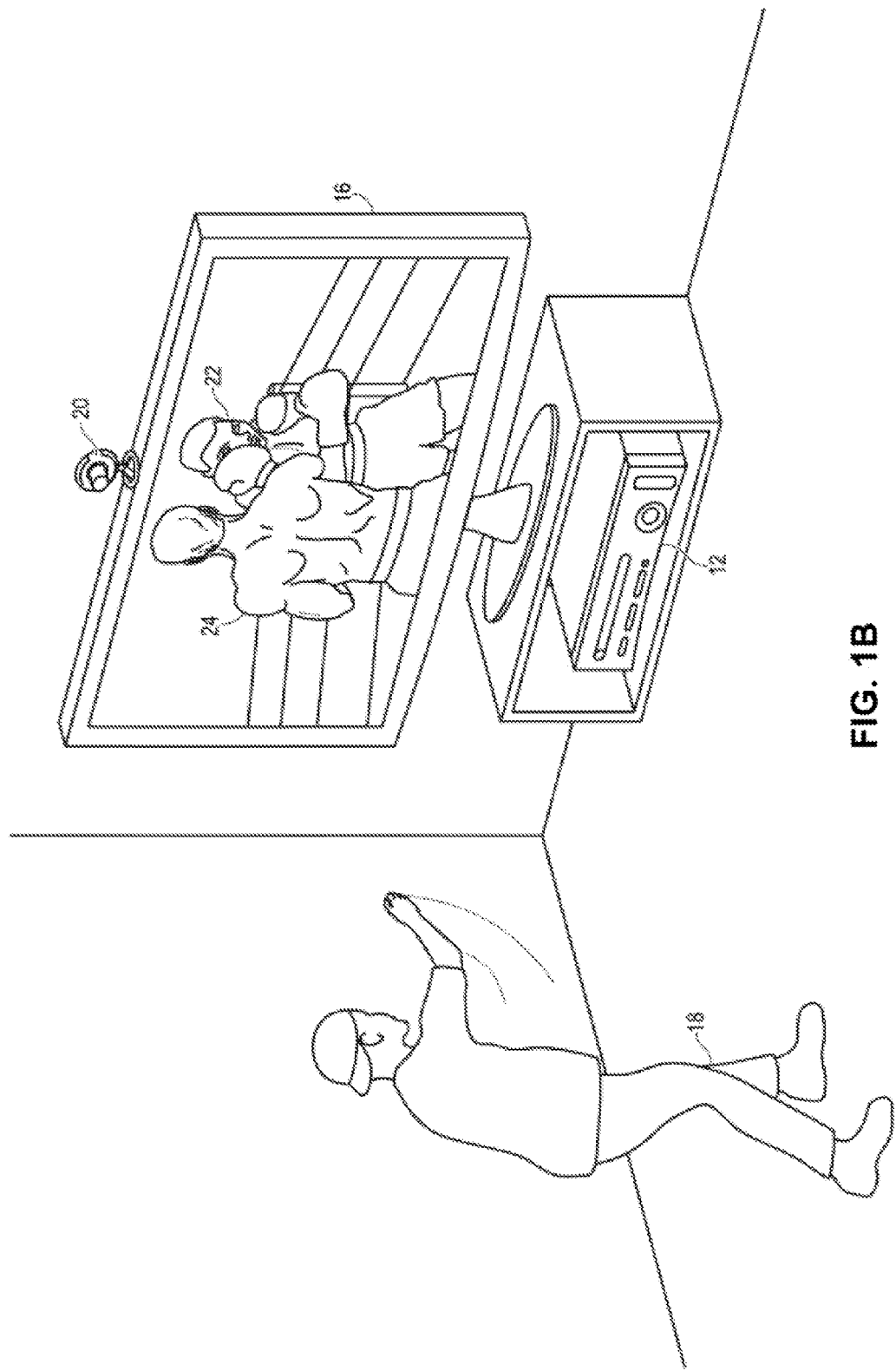

FIGS. 1A and 1B illustrate an example embodiment of a system 10 which can be used with the present technology. One use of the exemplary tracking system 10 is where a user 18 plays a game. In FIG. 1 the example is the user playing a boxing game. In an example embodiment, the system 10 may be used to recognize, analyze, and/or track a human target such as the user 18 or other objects within range of tracking system 10.

As shown in FIG. 1, tracking system 10 may include a computing system 12. The computing system 12 may be a computer, a gaming system or console, or the like. According to an example embodiment, the computing system 12 may include hardware components and/or software components such that computing system 12 may be used to execute applications such as gaming applications, non-gaming applications, or the like. In one embodiment, computing system 12 may include a processor such as a standardized processor, a specialized processor, a microprocessor, or the like that may execute instructions stored on a processor readable storage device for performing the processes described herein.

As shown in FIG. 1A, tracking system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within the application and/or animate an avatar or on-screen character, as will be described in more detail below.

According to one embodiment, the tracking system 10 may be connected to an audio/visual device 16 such as a television, a monitor, a high-definition television (HDTV), or the like that may provide game or application visuals and/or audio to a user such as the user 18. For example, the computing system 12 may include a video adapter such as a graphics card and/or an audio adapter such as a sound card that may provide audio/visual signals associated with the game application, non-game application, or the like. The audio/visual device 16 may receive the audio/visual signals from the computing system 12 and may then output the game or application visuals and/or audio associated with the audio/visual signals to the user 18. According to one embodiment, the audio/visual device 16 may be connected to the computing system 12 via, for example, an S-Video cable, a coaxial cable, an HDMI cable, a DVI cable, a VGA cable, component video cable, or the like.

As shown in FIGS. 1A and 1B, the tracking system 10 may be used to recognize, analyze, and/or track a human target such as the user 18. For example, the user 18 may be tracked using the capture device 20 such that the gestures and/or movements of user 18 may be captured to animate an avatar or on-screen character and/or may be interpreted as controls that may be used to affect the application being executed by computer environment 12. Thus, according to one embodiment, the user 18 may move his or her body to control the application and/or animate the avatar or on-screen character. Similarly, tracking system 10 may be used to recognize, analyze, and/or track persons who are watching user 18 play the game so that movement by those persons watching user 18 play the game will control movement avatars in the audience at the boxing game displayed on audio/visual device 16.

In the example depicted in FIGS. 1A and 1B, the application executing on the computing system 10 may be a boxing game that the user 18 is playing. For example, the computing system 12 may use the audio/visual device 16 to provide a visual representation of a boxing opponent 22 to the user 18. The computing system 12 may also use the audio/visual device 16 to provide a visual representation of a user avatar 24 that the user 18 may control with his or her movements. For example, as shown in FIG. 1B, the user 18 may throw a punch in physical space to cause the user avatar 24 to throw a punch in game space. Thus, according to an example embodiment, the computer system 12 and the capture device 20 recognize and analyze the punch of the user 18 in physical space such that the punch may be interpreted as a game control of the user avatar 24 in game space and/or the motion of the punch may be used to animate the user avatar 24 in game space.

In example embodiments, the human target such as the user 18 may have an object. In such embodiments, the user of an electronic game may be holding the object such that the motions of the user and the object may be used to adjust and/or control parameters of the game. Objects not held by the user can also be tracked, such as objects thrown, pushed or rolled by the user (or a different user) as well as self propelled objects. In addition to boxing, other games can also be implemented.

According to other example embodiments, the tracking system 10 may further be used to interpret target movements as operating system and/or application controls that are outside the realm of games. For example, virtually any controllable aspect of an operating system and/or application may be controlled by movements of the target such as the user 18.

Figure 2:
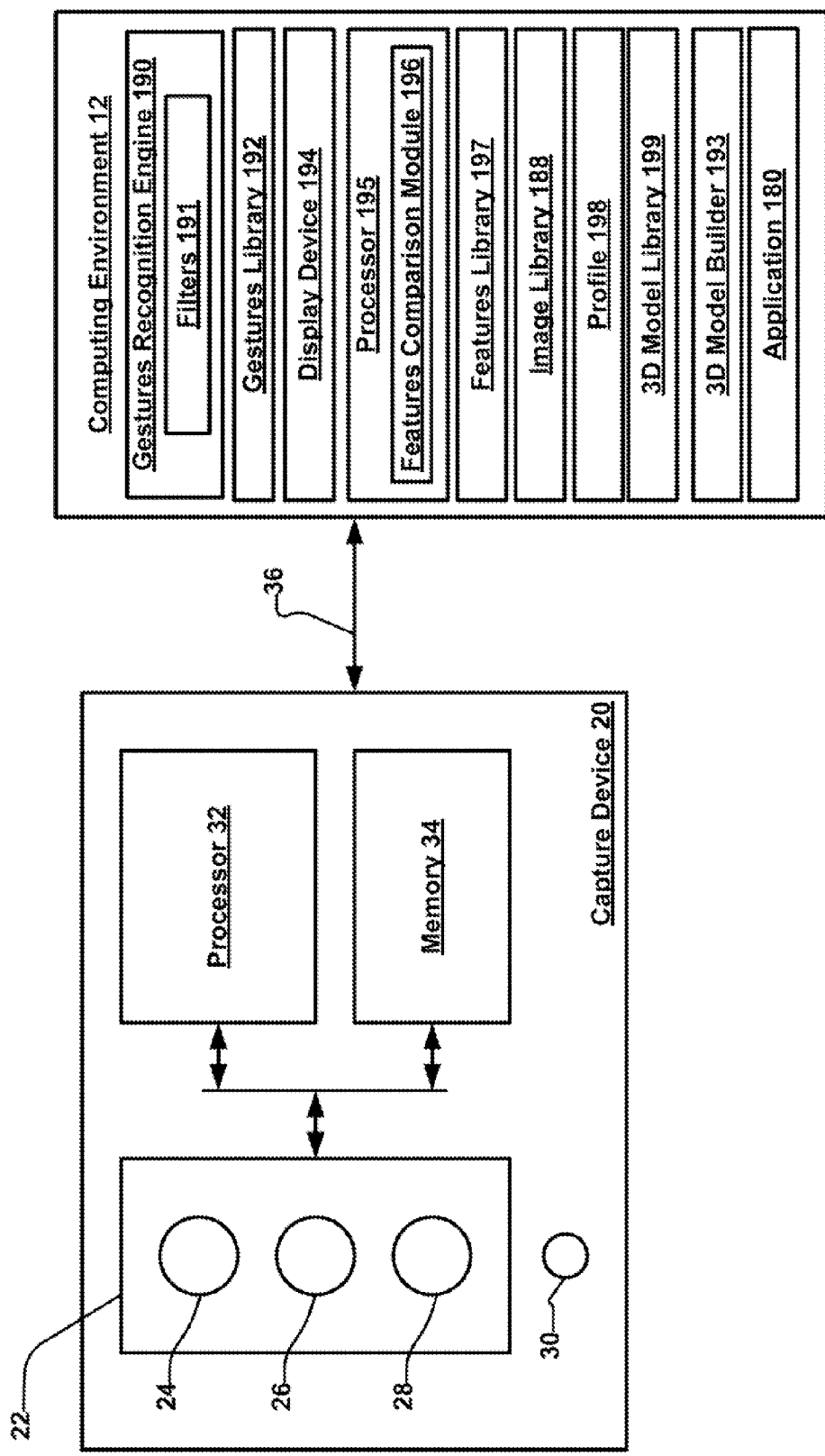
FIG. 2 illustrates an example embodiment of a capture device that may be used as part of the tracking system.

FIG. 2 illustrates an example embodiment of a capture device 20 that may be used for target recognition, analysis, and tracking in a scene, where the target can be a user or an object. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. Each of these components is focused on a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras that may view a scene from different angles, to obtain visual stereo data that may be resolved to generate depth information.

In another example embodiment, the capture device 20 may use point cloud data and target digitization techniques to detect features of the user.

The capture device 20 may further include a microphone 30, or an array of microphones. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-d camera 26 or RGB camera 28, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, control an application such as a game or word processor. For example, as shown, in FIG. 2, the computing environment 12 may include a gestures library 192.

Computing environment 12 may include a gesture recognition engine 190 including gesture filters 191, a gestures library 192, a display device 194, a processor 195 including a feature comparison model 196, a features library 197, an image library 188, user profile information 198, a 3-D model library 198, a 3-D model builder 193 and one or more applications 180. In the present example, application 180 is an interactive shopping application.

Processor 195 can execute instructions for receiving data of a scene, wherein the data includes data representative of the target in a physical space. The instructions comprise instructions for detecting at least one target feature from the data, and comparing the at least one detected target feature to visual representation feature options from the features library 195. The visual representation feature options may comprise selectable options configured for application to the visual representation. Further instructions provide for selecting a visual representation feature from the visual representation feature options, applying the visual representation feature to the visual representation of the target, and rendering the visual representation. The visual representation may be auto-generated from the comparison of the at least one detected feature to the visual representation feature options such that the selection of the visual representation feature is performed without manual selection by a user.

The selection of the visual representation feature may comprise selecting the visual representation feature that is similar to the detected target feature. The visual representation feature may be at least one of a facial feature, a body part, a color, a size, a height, a width, a shape, an accessory, or a clothing item. The instructions may provide for generating a subset of visual representation feature options, from the visual representation feature options, for the visual representation feature, and providing the generated subset of feature options for user selection of the visual representation feature to apply to the visual representation. The generated subset of visual representation feature options may comprise multiple visual representation feature options that are similar to the detected target feature. The instructions may provide for receiving a user selection of a visual representation feature from the generated subset of feature options, wherein selecting the visual representation feature from the visual representation feature options comprises selecting the visual representation feature that corresponds to the user selection. The visual representation, having the visual representation feature, may be rendered in real time. Furthermore, the instructions may provide for monitoring the target and detecting a change in the detected target feature, and updating the visual representation of the target by updating the visual representation feature applied to the visual representation, in real time, based on the change in the detected target feature.

As shown, in FIG. 2, the computing environment 12 may include a gestures library 192 and a gestures recognition engine 190. The gestures recognition engine 190 may include a collection of gesture filters 191. A filter may comprise code and associated data that can recognize gestures or otherwise process depth, RGB, or skeletal data. Each filter 191 may comprise information defining a gesture along with parameters, or metadata, for that gesture. For instance, a throw, which comprises motion of one of the hands from behind the rear of the body to past the front of the body, may be implemented as a gesture filter 191 comprising information representing the movement of one of the hands of the user from behind the rear of the body to past the front of the body, as that movement would be captured by a depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between applications, between contexts of a single application, or within one context of one application over time.

While it is contemplated that the gestures recognition engine 190 may include a collection of gesture filters 191, where a filter may comprise code or otherwise represent a component for processing depth, RGB, or skeletal data, the use of a filter is not intended to limit the analysis to a filter. The filter is a representation of an example component or section of code that analyzes data of a scene received by a system, and comparing that data to base information that represents a gesture. As a result of the analysis, the system may produce an output corresponding to whether the input data corresponds to the gesture. The base information representing the gesture may be adjusted to correspond to the recurring feature in the history of data representative of the user's capture motion. The base information, for example, may be part of a gesture filter as described above. But, any suitable manner for analyzing the input data and gesture data is contemplated.

In an example embodiment, a gesture may be recognized as a trigger for the entry into a modification mode, where a user can modify the visual representation auto-generated by the system. For example, a gesture filter 191 may comprise information for recognizing a modification trigger gesture. If the modification trigger gesture is recognized, the application may go into a modification mode. The modification trigger gesture may vary between applications, between systems, between users, or the like. For example, the same gesture in a tennis gaming application may not be the same modification trigger gesture in a bowling game application. Consider an example modification trigger gesture that comprises a user motioning the user's right hand, presented in front of the user's body, with the pointer finger pointing upward and moving in a circular motion. The parameters set for the modification trigger gesture may be used to identify that the user's hand is in front of the user's body, the user's pointer finger is pointed in an upward motion, and identifying that the pointer finger is moving in a circular motion.

Certain gestures may be identified as a request to enter into a modification mode, where if an application is currently executing, the modification mode interrupts the current state of the application and enters into a modification mode. The modification mode may cause the application to pause, where the application can be resumed at the pause point when the user leaves the modification mode. Alternately, the modification mode may not result in a pause to the application, and the application may continue to execute while the user makes modifications.

The data captured by the cameras 26, 28 and device 20 in the form of the skeletal model and movements associated with it may be compared to the gesture filters 191 in the gestures library 192 to identify when a user (as represented by the skeletal model) has performed one or more gestures. Thus, inputs to a filter such as filter 191 may comprise things such as joint data about a user's joint position, like angles formed by the bones that meet at the joint, RGB color data from the scene, and the rate of change of an aspect of the user. As mentioned, parameters may be set for the gesture. Outputs from a filter 191 may comprise things such as the confidence that a given gesture is being made, the speed at which a gesture motion is made, and a time at which the gesture occurs.

The computing environment 12 may include a processor 195 that can process the depth image to determine what targets are in a scene, such as a user 18 or an object in the room. This can be done, for instance, by grouping together of pixels of the depth image that share a similar distance value. The image may also be parsed to produce a skeletal representation of the user, where features, such as joints and tissues that run between joints are identified. There exist skeletal mapping techniques to capture a person with a depth camera and from that determine various spots on that user's skeleton, joints of the hand, wrists, elbows, knees, nose, ankles, shoulders, and where the pelvis meets the spine. Other techniques include transforming the image into a body model representation of the person and transforming the image into a mesh model representation of the person.

In an embodiment, the processing is performed on the capture device 20, and the raw image data of depth and color (where the capture device 20 comprises a 3-D camera 26) values are transmitted to the computing environment 12 via link 36. In another embodiment, the processing is performed by a processor 32 coupled to the camera 402 and then the parsed image data is sent to the computing environment 12. In still another embodiment, both the raw image data and the parsed image data are sent to the computing environment 12. The computing environment 12 may receive the parsed image data but it may still receive the raw data for executing the current process or application. For instance, if an image of the scene is transmitted across a computer network to another user, the computing environment 12 may transmit the raw data for processing by another computing environment.

The processor may have a features comparison module 196. The features comparison module 196 may compare the detected features of a target to the options in the features library 197. The features library 197 may provide visual representation feature options, such as color options, facial feature options, body type options, size options, etc, and the options may vary for human and non-human targets. The library may be a catalog, a database, memory, or the like, that stores the features for the visual representation. The library may an organized or unorganized collection of features options. The system or user may add features to the catalog. For example, an application may have a pre-packaged set of feature options or the system may have a default number of available features. Additional feature options may be added to or updated in the features library 197. For example, the user may purchase additional feature options in a virtual marketplace, a user may gift feature options to another user, or the system may generate feature options by taking a snapshot of the user's detected features.

The image library 188 may be a collection of images retrieved by the capture device 20 including particular features of users who interact with the capture device. Images may be used to render on-screen scenes in accordance with the discussion below. The image library 188 may also store images scanned by the capture device of articles in the scene.

The features comparison module 196 may make feature selections, such as from the catalog of feature options, that most closely resemble the detected features of the target. The system may auto-generate a virtual object that has the detected features. For example, consider the detection of a red, two-seater couch in the physical space. The system may identify the features from the features library 197 that, alone or in combination, resemble the detected target features of the couch In an example embodiment, the selection from the features library 197 may be as simple as selecting a virtual target that has at least one feature of the physical target. For example, the features library 197 may have numerous feature options for furniture and may include a virtual image or depiction of a red, two-seater couch. Such features may be pre-packaged and provided with an application or with the system. In another example, the system may take a snapshot of the physical couch and create a cartoon or virtual image that takes the shape of the physical couch. Thus, the feature selected may be from a snapshot of the physical couch previously taken by the system and added to the features library 197.

The system may adjust the color, positioning, or scale of a selected feature based on the detected target features and store this information in a 3-D model library 199. For example, the system may select a feature or combine several features from the features library 197 that resemble the features of the detected target. The system may add features to a selected feature or virtual image to more fully resemble the detected target. In the example of the detected couch, the system may perform a feature look-up in the features library 197 and identify a virtual frame for a couch having at least one feature that resembles a feature of the physical couch. For example, the system may initially select a virtual couch that resembles the detected physical couch in shape. If a virtual two-seater couch is an available feature option, the system may select the virtual two-seater. Colors may be feature options selectable by the system. In this example, if a red couch is specifically not an option in the features library 197, the system may select a color from the features library 197 and apply it to the virtual frame selected. The system may select an existing color in the features library 197 that resembles the detected red color of the physical couch, or the system may take a snapshot of the color of the physical couch and add it to the features library as a feature option. The system may apply the selected red color feature to the virtual couch image.

Physical models may be components of the selected target. In general, modeling of cloth and garments worn by virtual models is performed by first attaching the cloth to a mesh to the body surface by defining attachment data of the garment mesh to the surface of the online representation. Cloth deformation makes use of shape of the underlying skin of a virtual model, or in this case the virtual representation. Each vertex of a garment mesh is associated with a triangle, edge, or vertex of a skin mesh.

Hence, for a garment, in one embodiment, a 3-D model includes a mesh of information use to determine how to apply the garment to a human model. Body deformation provides resizing of the cloth or garment model. Physics-based models have been developed that are able to simulate the dynamics of cloth independent of its use whether it's clothing or other situations such as furniture or tablecloths. Such models integrate complex clothing detection and simulate physical behavior of the garments. Any of these modeling techniques may be utilized to generate a three-dimensional article model for use in the application. One popular way of modeling the mechanics of clothes are spring-mass particle systems. They are composed of 3-D punctual masses, connected to their neighbors by springs. The mechanical behaviors of clothes are simulated by competing forces applied on each mass given their position and velocity. There are different ways to complete the numerical integration. Garments interact with objects in their environment either with the body that wears them or with other garment pieces. Dealing with collisions involves two types of problems, collision detection and collision response. A shopping application 180 will use this information stored in the 3-D model to find the geometrical contacts between the objects and integrate the resulting reaction and friction effects in a mechanical simulation presented on the display 194.

In another example, the target is a human user and the system detects the user's features, such as eye color, size, and shape, hair color, type, and length, etc. The system may compare the detected features to a catalog of feature options and apply selected features to the visual representation. As described above, the system may combine features and alter those features. For example, the features may be altered by applying a color, positioning, or scaling to the target. The features may be altered by the selection of additional features from the features library 197, such as a color, or by using image data from a snapshot of the target. For example, an application may provide a generic set of solid color pants, t-shirts, and shoe types in the features library 197. The system may select from the generic clothing features but alter the selected clothing features by applying colors to the clothing to reflect the colors of the target's clothing detected by the system.

The 3-D model library storing features and models of elements used in an on-screen interface by a user. The 3-D model library may include physical models of articles. Additional meta-data may be associated with each model to provide, for example, information on how the article interacts with other articles. For example, a 3-D model of a lamp may record the type light the lamp provides and the coverage of the light.

The computing environment 12 may use a 3-D Model Builder 193 to create 3-D models from scanned scene information available from the image library and the capture device.

In another example, the system may identify a subset of features in the features library 197 that resemble the user's features and provide the subset from which the user may choose. Thus, the number of options provided to the user for a particular feature may be intelligently filtered to make it easier for the user to customize the visual representation.

The computing environment 12 may use the gestures library 192 to interpret movements of the skeletal model and to control an application based on the movements. Filters may be modular or interchangeable so that a first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

Gesture recognizer engine 190 provides functionality to the filters. In one embodiment, the functionality that the recognizer engine 190 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 191 are loaded and implemented on top of recognizer engine 190 and can utilize services provided by recognizer engine 190. Application 180 may use the filters 191 provided by the recognizer engine 190, or it may provide its own filters which plugs into recognizer engine 190. In one embodiment, all filters have a common interface to enable this plug-in characteristic. Further, all filters may utilize parameters, so a single gesture tool below may be used to debug and tune the entire filter system.

More information about recognizer engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009. Both of which are incorporated by reference herein in their entirety.

The computing environment 12 can model and display a representation of a human target user, or a representation of another individual for whom a 3D model is stored, such as in the form of an avatar or a pointer on a display, such as in a display device 193. Display device 193 may include a computer monitor, a television screen, or any suitable display device. For example, a camera-controlled computer system may capture user image data and display user feedback on a television screen that maps to the user's gestures. The user feedback may be displayed as an avatar or other on screen representation of the user, on the screen such as shown in FIGS. 1A and 1B. The avatar's motion can be controlled directly by mapping the avatar's movement to those of the user's movements. The user's gestures may be interpreted control certain aspects of the application.

According to an example embodiment, the target may be a human target in any position such as standing or sitting, a human target with an object, two or more human targets, one or more appendages of one or more human targets or the like that may be scanned, tracked, modeled and/or evaluated to generate a virtual screen, compare the user to one or more stored profiles and/or to store profile information 198 about the target in a computing environment such as computing environment 12. The profile information 198 may be in the form of user profiles, personal profiles, application profiles, system profiles, or any other suitable method for storing data for later access. The profile information 198 may be accessible via an application or be available system-wide, for example. The profile information 198 may include lookup tables for loading specific user profile information. The virtual screen may interact with an application that may be executed by the computing environment 12 described above with respect to FIGS. 1A-1B.

The system may render a visual representation of a human target, such as a user, by auto-generating the visual representation based on information stored in the user's profile. According to example embodiments, lookup tables may include user specific profile information. In one embodiment, the computing environment such as computing environment 12 may include stored profile data 198 about one or more users in lookup tables. The stored profile data 198 may include, among other things the targets scanned or estimated body size, skeletal models, body models, voice samples or passwords, the target's gender, the targets age, previous gestures, target limitations and standard usage by the target of the system, such as, for example a tendency to sit, left or right handedness, or a tendency to stand very near the capture device. This information may be used to determine if there is a match between a target in a capture scene and one or more user profiles 198, which, in one embodiment, may allow the system to adapt the virtual screen to the user, or to adapt other elements of the computing or gaming experience according to the profile 198.

Previously selected features for the target's visual representation may be stored in a profile. For example, a user-specific profile may store the features selected and applied to auto-generate the user's visual representation. A location-specific profile may store features selected and applied to auto-generate and display a virtual scene that resembles the physical space. For example, virtual objects that correspond to objects in the physical space, such as furniture in the room, may be generated by selecting from options in the features library 197. Colors may be detected and available colors may be selected from the features library 197. Upon recognition or initialization by the system, the location-specific profile may be loaded, displaying the furniture and colors that correspond to the location.

One or more personal profiles 198 may be stored in computer environment 12 and used in a number of user sessions, or one or more personal profiles may be created for a single session only.

The gestures library 192, gestures recognition engine 190, features library 197, features comparer 196 and profile 198 may be implemented in hardware, software or a combination of both. For example, the gestures library 192, and gestures recognition engine 190. may be implemented as software that executes on a processor, such as processor 195, of the computing environment 12 (or on processing unit 101 of FIG. 3 or processing unit 259 of FIG. 4). The gestures library and filter parameters may be tuned for an application or a context of an application by a gesture tool. A context may be a cultural context, and it may be an environmental context.

It is emphasized that the block diagram depicted in FIGS. 3-4 described below are exemplary and not intended to imply a specific implementation. Thus, the processor 195 FIG. 2, the processing unit 101 of FIG. 3, and the processing unit 259 of FIG. 4, can be implemented as a single processor or multiple processors. Multiple processors can be distributed or centrally located. For example, the gestures library 192 may be implemented as software that executes on the processor 32 of the capture device or it may be implemented as software that executes on the processor 195 in the computing environment 12. Any combination of processors that are suitable for performing the techniques disclosed herein are contemplated. Multiple processors can communicate wirelessly, via hard wire, or a combination thereof.

Furthermore, as used herein, a computing environment 12 may refer to a single computing device or to a computing system. The computing environment may include non-computing components. The computing environment may include a display device, such as display device 194 shown in FIG. 2. A display device may be an entity separate but coupled to the computing environment or the display device may be the computing device that processes and displays, for example. Thus, a computing system, computing device, computing environment, computer, processor, or other computing component may be used interchangeably.

Figure 3:
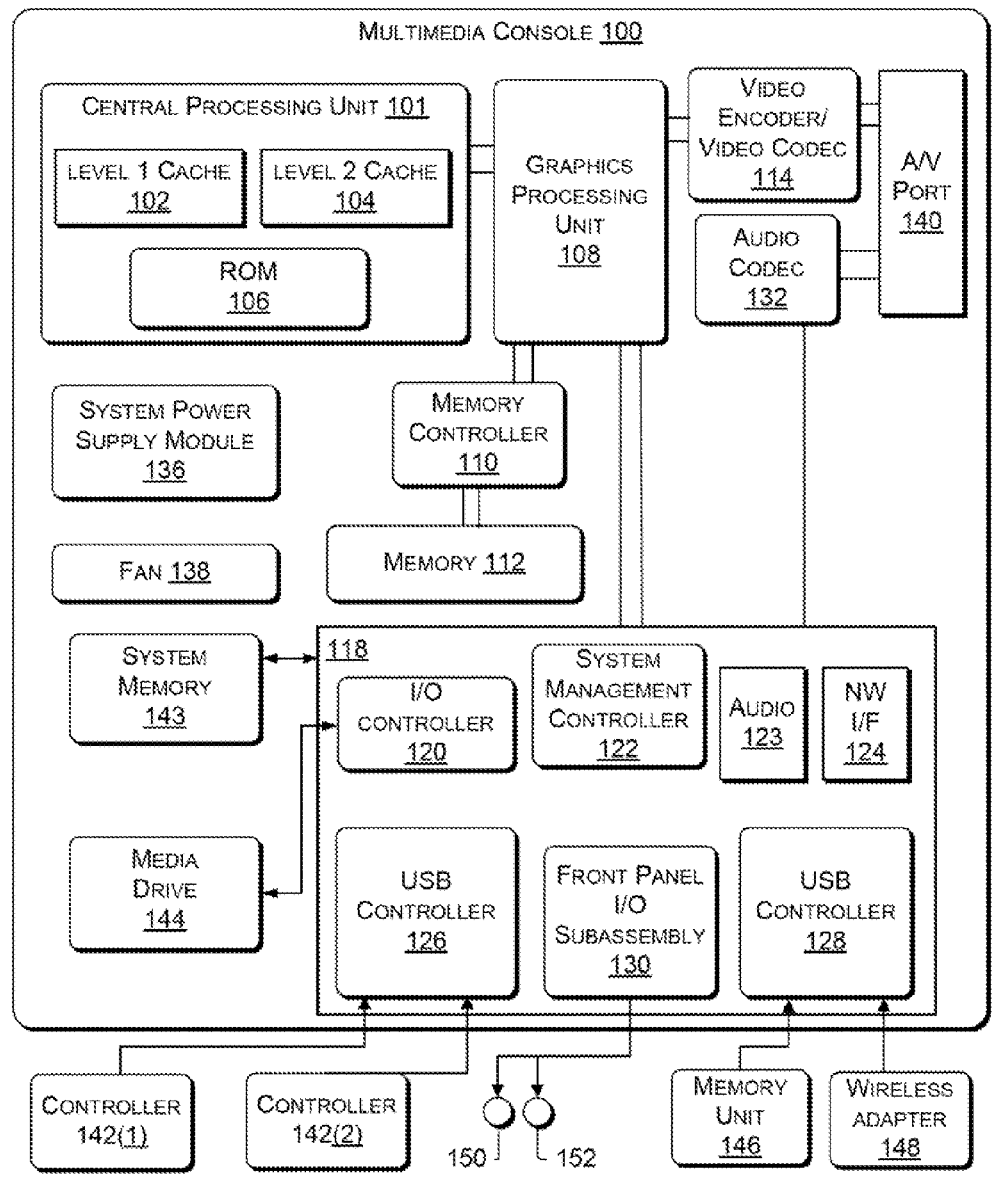
FIG. 3 depicts an example of a processing device that may be used to track motion and execute and application based on the tracked motion.

FIG. 3 illustrates an example embodiment of a computing system that may be the computing system 12 shown in FIGS.

1A-2 used to track motion and/or animate (or otherwise update) an avatar or other on-screen object displayed by an application. The computing system such as the computing system 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, Blu-Ray drive, hard disk drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio user or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100 via USB controller 126 or other interface.

Figure 4:
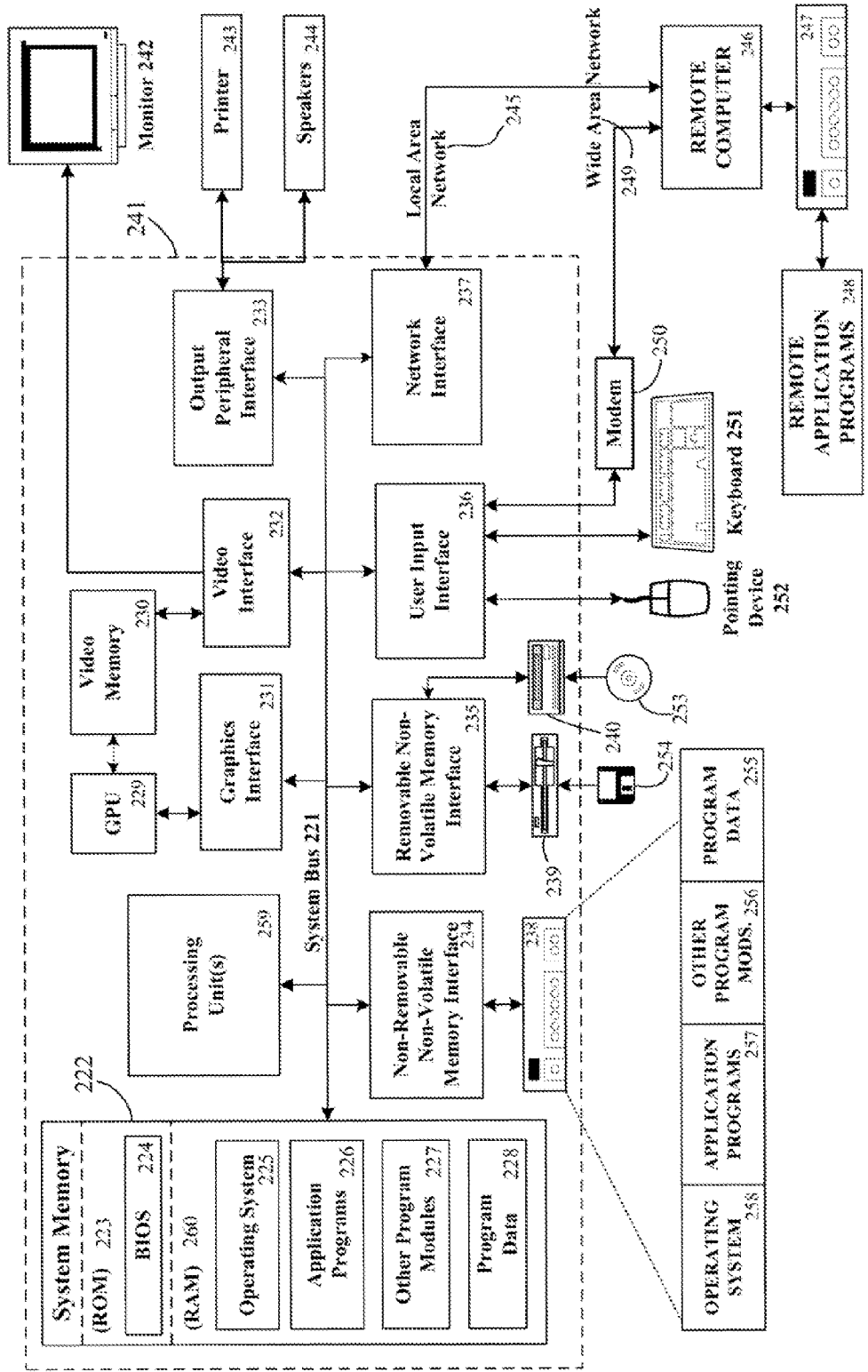
FIG. 4 illustrates a second example embodiment of a computing system that may be used to track motion and update an application based on the tracked motion.

FIG. 4 illustrates another example embodiment of a computing system 220 that may be used to implement the computing system 12 shown in FIGS. 1A-2 to track motion and/or animate (or otherwise update) an avatar or other on-screen object displayed by an application. The computing system environment 220 is only one example of a suitable computing system and is not intended to suggest any limitation as to the scope of use or functionality of the presently disclosed subject matter. Neither should the computing system 220 be interpreted as having any dependency or requirement relating to any one or combination of components illustrated in the exemplary operating system 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/ software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100 that connect via user input interface 236. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233. Capture Device 20 may connect to computing system 220 via output peripheral interface 233, network interface 237, or other interface.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted include a local area network (LAN) 245 and a wide area network (WAN) 249, but may also include other networks. Such networking environments are commonplace in offices, enterprise-wide computer networks, intranets and the Internet.

Figure 5:
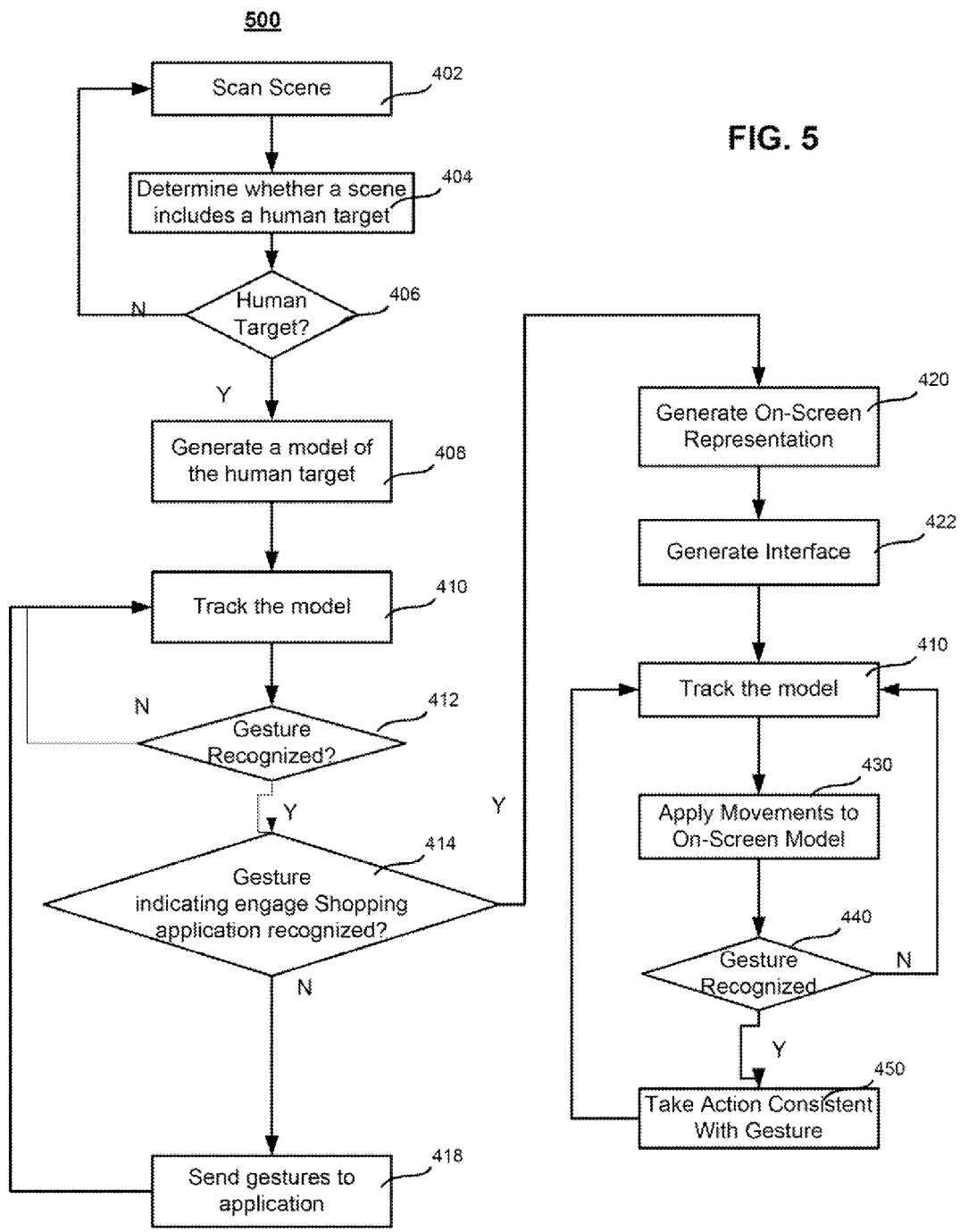
FIG. 5 is a flowchart illustrating a method which may be implemented by the devices illustrated in FIGS. 1-4 to execute an application.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 5 illustrates application programs 248 as residing on memory device 247. It will be appreciated that the network connections shown are exemplary and other means of establishing a communications link between the computers may be used.

Either of the systems of FIG. 3 or 4, or a different computing system, can be used to implement Computing System 12 of FIG. 2. As explained above, computing system 12 determines the motions of the users and employs those detected motions to control a video game or other application. For example, a user's motions can be used to control an avatar and/or object in a video game. In some embodiments, the system can simultaneously track multiple users and allow the motion of multiple users to control or effect the application.

The system will use the RGB images and depth images to track a user's movements. For example, the system will track a skeleton of a person using a depth images. There are many methods that can be used to track the skeleton of a person using depth images. One suitable example of tracking a skeleton using depth images is provided in U.S. patent application Ser. No. 12/603,437, "Pose Tracking Pipeline," filed on Oct. 21, 2009. (hereinafter referred to as the '437 application), incorporated herein by reference in its entirety. The process of the '437 application includes acquiring a depth image, down sampling the data, removing and/or smoothing high variance noisy data, identifying and removing the background, and assigning each of the foreground pixels to different parts of the body. Based on those steps, the system will fit a model with the data and create a skeleton. The skeleton will include a set of joints and connections between the joints.

In one embodiment, in order for a user's motion to be used to control an application the user must first be enrolled or bound to the application. In one embodiment, each user will be asked to identify himself or herself by standing in front of the system so that depth images and/or visual images can be obtained from multiple angles for that user. For example, the user may be asked to stand in front of the camera, turn around, and make various poses while depth images and visual images are obtained. After the system obtains enough depth and/or visual images, the system will create a set of identifying data from the images that uniquely identifies the user. The system will create a unique identification and associate that unique identification with on-screen representation (e.g., avatar) or other object in the game/application. After a user is enrolled in (or bound to) the application, the system will track the motion of that user while the user is actively engaged with the application (e.g., playing the game or using the application). However, in the past, other people in the room who are not actively engaged with the application, (e.g., not bound to application, bound to application but not playing current game, or bound to application but currently not having a turn to play) do not have a way to interact with the application.

FIG. 5 is a flow chart illustrating a general method to provide an independent motion tracking based shopping application in accordance with the present technology.

In FIG. 5, a scene is scanned at 402 in accordance with the discussion herein using the capture system illustrated in FIG. 2 and the process described below at FIG. 6. At step 404, the system time determines whether the scene includes a human target. Selection of a human target within a scene is discussed below with respect to FIG. 7. At step 406, scanning is continuous until a human target is found. Once a human target is detected at 406, a model of the human target is generated at 408. A model of the target is illustrated in FIG. 8. At step 410, the model is continuously tracked.

Suitable tracking technology is also disclosed in U.S. patent application Ser. No. 12/475,308, "Device for Identifying and Tracking Multiple Humans Over Time," filed on May 29, 2009, incorporated herein by reference in its entirety; U.S. patent application Ser. No. 12/696,282, "Visual Based Identity Tracking," filed on Jan. 29, 2010, incorporated herein by reference in its entirety; U.S. patent application Ser. No. 12/641,788, "Motion Detection Using Depth Images," filed on Dec. 18, 2009, incorporated herein by reference in its entirety; and U.S. patent application Ser. No. 12/575,388, "Human Tracking System," filed on Oct. 7, 2009, incorporated herein by reference in its entirety.

Movements of the model are presented to the system which waits for a gesture or other indication indicating that the user wishes to engage or otherwise perform an action on system 10. If the gesture is recognized at 412, a determination is made as to whether or not the gesture indicates the user wishes to engage in a shopping application at 414. If not, another application may be engaged at 418 and application gestures beyond that point tracked at step 410 are sent to the engaged application at 418. Other applications at 418 may include video games such as those illustrated in FIG. 1A or 1B as well as administrative tasks available to users of system 10.

Techniques for gesture recognition are disclosed in U.S. patent application Ser. No. 12/422,661, "Gesture Recognizer System Architecture," filed on Apr. 13, 2009; U.S. patent application Ser. No. 12/391,150, "Standard Gestures," filed on Feb. 23, 2009; and U.S. patent application Ser. No. 12/474,655, "Gesture Tool" filed on May 29, 2009, all of which are incorporated by reference herein in their entirety.

If the shopping application is engaged at 414, an on-screen representation of the human target is generated at 420. At 422, a shopping interface is generated on the display 16. The shopping interface may comprise any variety of interface designed to allow the user to manipulate a series of virtual articles presented in the interface through movements captured by the system 10. The virtual articles presented represent real-world articles that a user may acquire through vendors, or which the user may already own and which the user wishes to have presented in the on-screen representation. For example, a user may wish to shop for a new item to match to a user's existing inventory of items. Representations of both items may be presented.

The model of the human target is continuously tracked at 410 and movements of the human target model are applied to the on-screen model at 430. This is discussed below with respect to FIGS. 6 and 11, and performed in accordance with the teachings of U.S. application Ser. Nos. 12/475,308, 12/696,282, 12/641,788, and 12/575,388.

If a user performs a gesture and the gesture is recognized at 440, action consistent with the gesture within the shopping application is applied at 450. As discussed below, shopping applications gestures can comprise two general types of gestures: an article manipulation gesture or a transaction manipulation gesture. An article manipulation gesture may comprise, for example, any of a number of shopping consistent actions consistent with the interface presented to the user.

If the user is presented a selection of virtual articles comprising clotting and an on-screen representation of themselves, article manipulation actions may comprise actions such as selecting clothes, putting on clothes, taking off clothes, adjusting clothes, changing backgrounds, changing accessories, moving room elements within a scene, placing items within a scene, placing the on-screen representation with a variety of backgrounds in particular clothing, and the like. A transaction gesture may comprise a gesture used to facilitate a transaction such as movement of an article into a shopping cart, removing an article from a shopping cart, entry of financial information and the like.

Figure 6:
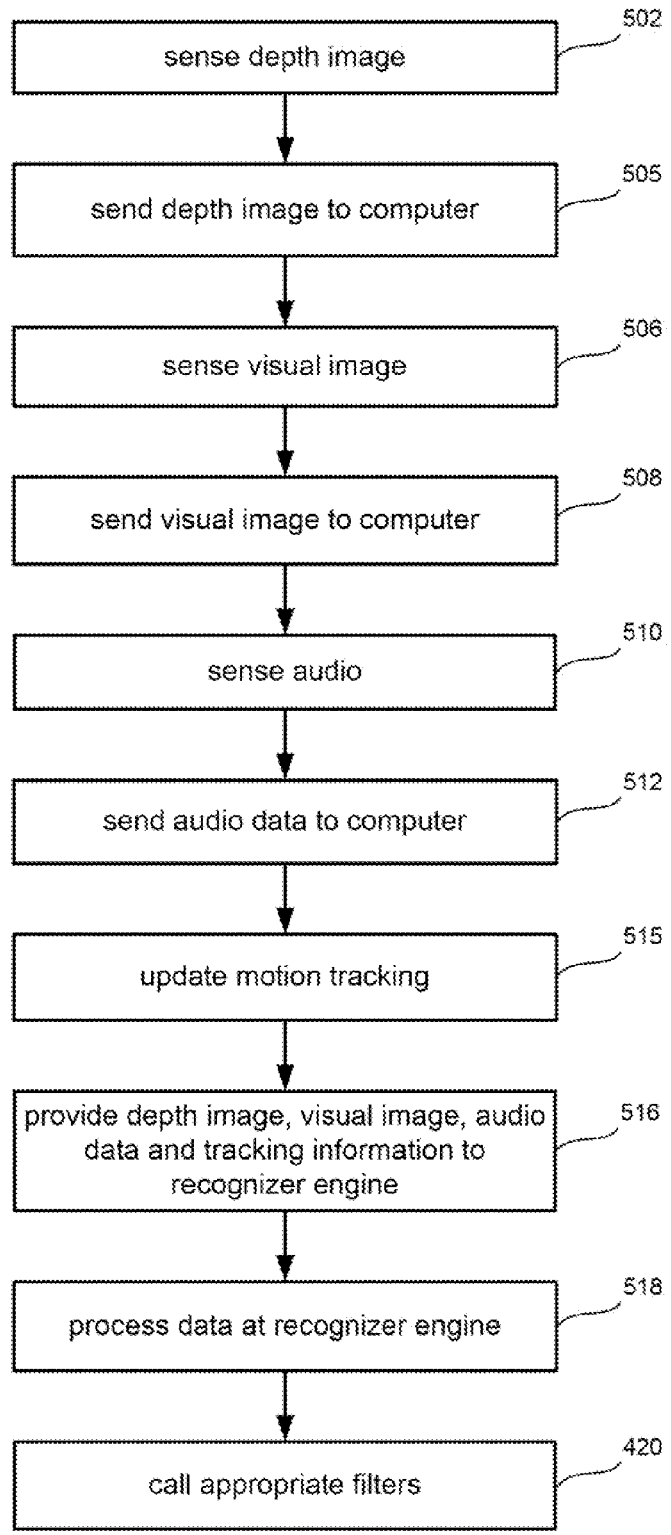
FIG. 6 is a flow chart describing one embodiment for automatically sensing one or more physical properties of an environment.

FIG. 6 is a flow chart describing one embodiment for automatically sensing one or more physical properties of an environment, including properties of one or more entities not actively engaged with the application and users who are actively engaged. The process of FIG. 6 is one example implementation of step 402 of FIG. 5. In step 502, capture device 20 will sense a depth image. In step 504, that depth image will be sent to computing system 12. In step 506, capture device 20 will sense a visual image. In step 508, that visual image will be sent to computing system 12. In step 510, capture device 20 will sense audio data. In step 512, that audio data will be sent to computing system 12. In step 514, depth image processing and skeleton tracking 50 will update the motion tracking based on the depth image, visual image and/or audio data. In step 516, the depth image, visual image and/or audio data, as well as tracking information, will be provided to recognizer engine 54. In step 518, recognizer engine 54 will process the received data and then call the appropriate one or more filters in step 520.

As noted above, FIG. 5 includes a step of identifying a gesture at steps 412 and 440. In one example, for each action that an application wishes to detect, there will be a separate gesture filter in filter set 191. In other implementations, one filter can determine more than one gesture or action. The recognition engine 190 will receive data throughout the performance of an application. Each filter that is employed will register with recognition engine 190, including indicating which data it is looking for. When recognition engine 190 sees that the data for a particular filter is available, recognition engine 190 will call the appropriate filter 191. It is possible that many filters are called concurrently or in an overlapping manner. Each of the filters that are called by recognition engine 190 to look for a specific set of one or more gestures or actions will automatically identify an action or condition based on the physical properties sensed. When a filter determines that a specific gesture or action it is looking for has occurred, the filter may report that information to an application.

Figure 7:
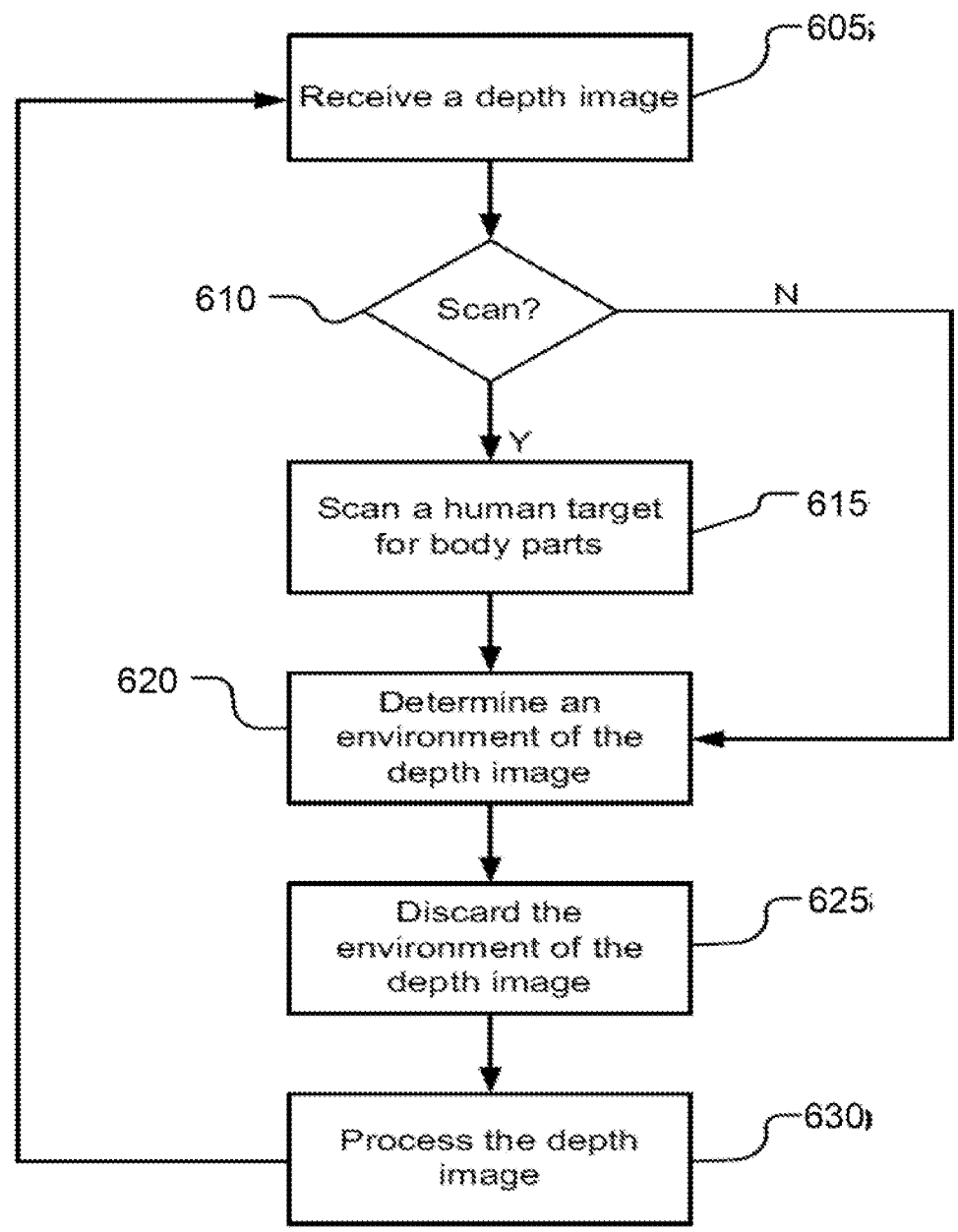
FIG. 7 is a flowchart illustrating selection of a human target within a scene.
Figure 8:
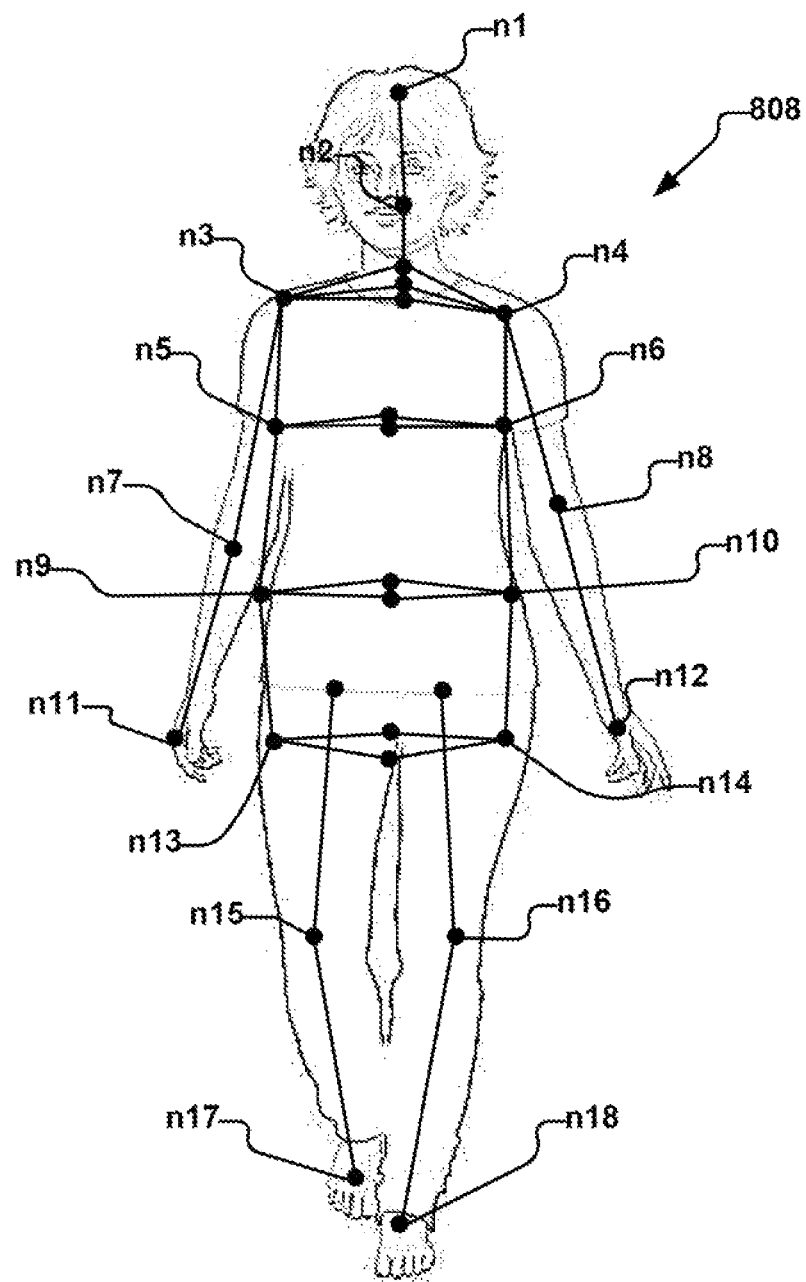
FIG. 8 illustrates an example embodiment of a skeletal model 808 representing a scanned human target used to track a human target in a scene.

FIG. 7 depicts a flow diagram of an example method for processing depth information in accordance with steps 404 and 406 of FIG. 6 including, for example, segmenting a human target from an environment in depth image that may be captured by a capture device. In an example embodiment, the example method 600 may take the form of program code (i.e., instructions) that may be executed by, for example, the capture device 20 and/or the computing environment 12 of system 1010. The method of determining whether a human is in the scene is disclosed in U.S. patent application Ser. No. 12/475,094 entitled "Environment And/Or Target Segmentation", filed 29 May 2009 and hereby fully incorporated herein by reference.

According to one embodiment, at 605, a depth image may be received. The capture device 20 may capture or observe a scene that may include one or more targets or objects. In an example embodiment, the capture device 20 may be a depth camera configured to obtain a depth image of the scene using any suitable technique such as time-of-flight analysis, structured light analysis, stereo vision analysis, or the like. The depth image may be a plurality of observed pixels where each observed pixel has an observed depth value. The depth image may include a two-dimensional (2-D) pixel area of the captured scene where each pixel in the 2-D pixel area may have a depth value such as a length or distance in, for example, centimeters, millimeters, or the like of an object in the captured scene from the capture device.

The depth image may include one or more human targets corresponding to, one or more users and one or more non-human targets such as a wall, a table, a monitor, a couch, a ceiling or the like in the captured scene. At 615, a human target in a depth image may be scanned for one or more body parts. In one embodiment, system 10 may determine whether a human target in the depth image may have been previously scanned, at 610, before the human target may be scanned at 615. For example, the capture device may capture a scene in frames. Each frame may include a depth image. The depth image of each frame may be analyzed to determine whether the depth image may include a human target as described above. The depth image of each frame may further be analyzed to determine whether the human target may have been previously scanned for one or more body parts. For example, at 610, system 10 may determine whether a human target in the depth image received, at 605, corresponds to a human target previously scanned at 615. In one embodiment, at 610, if the human target may not correspond to a human target previously scanned, the human target may then be scanned at 615.

At 620, an environment of the depth image may be determined. For example, the depth image may be a plurality of observed pixels in a two-dimensional (2-D) pixel area where each observed pixel has an observed depth value. In one embodiment, system 10 may determine whether one or more of the pixels in the depth image may be associated with the human target or environment of the depth image. In an example embodiment, the system may determine the environment of the depth image by initially defining a bounding box around each foreground object such as each human target in the depth image received at 605. The bounding box may be defined by the centroid and/or measurements determined based on, for example, the scan at 615. After defining the bounding box for each human target, the pixels in the depth image outside the bounding box may be identified as environment.

The system may further determine the environment of a depth image by flood filling one or more pixels associated with the a human target such as the human target at 620. For example, system 20 may detect edges of, for example, the foreground object such as the human target by comparing various depth values of nearby pixels such that the pixels within the edges of the human target may be flood filled. In addition, system 20 may detect edges of the foreground object such as the human target by comparing various depth values of nearby pixels that may be within the bounding box. According to an example embodiment, system 10 may detect the edges of a human target by analyzing various pixels within, for example, the bounding box using a predetermined edge tolerance. One body part of the human target (such as user 1002 in FIG. 9) may be separated from another body part of the human body. For example, an infrared shadow may be cast by a body part such that the body part may be separated from another body part of the human target. In another example embodiment, a body part such as a head may be separated from a torso of the human target by, for example, facial hair, various articles of clothing, or the like.

Additionally, as described above, the body parts that may be separated by, for example, facial hair, various articles of clothing, or the like by invalid depth values. At 620, system 10 may use depth history data to determine the environment or the non-human target pixels of the depth image. At 625, the environment of the depth image may be removed or discarded. For example, upon flood filling the pixels associated with the human target by determining whether pixels may be associated with the human target as described above, the target recognition, analysis and tracking system may discard the pixels that may not be associated with the flood filled human target. Thus, in one embodiment, at 625, the target recognition analysis and tracking system may discard or remove the pixels associated with the environment of the depth image based on the flood filled human target such that the human target including the pixels and depth values associated therewith may be isolated in the depth image. According to an example embodiment, system 10 may discard the pixels associated with the environment by assigning them, for example, an invalid depth value such as a depth value of zero.

The depth image with the isolated human target may be processed at 630. In one embodiment, system 10 may process the depth image with the isolated human target such that a model of the human target in the captured scene may be generated.

For example, according to an example embodiment, a model such as a skeletal model, a mesh human model, or the like of a user such as the user 18 described with respect to FIG. 8.

The visual appearance of an on-screen character may then be changed in response to changes to the model being tracked. For example, a user such as the user 18 described above with respect to FIGS. 1A and 1B playing an electronic game on a gaming console may be tracked by the gaming console as described herein. In particular, a body model such as a skeletal model may be used to model the target game player, and the body model may be used to render an on-screen player avatar. As the game player straightens one arm, the gaming console may track this motion, then in response to the tracked motion, adjust the body model accordingly. The gaming console may also apply one or more constraints to movements of the body model. Upon making such adjustments and applying such constraints, the gaming console may display the adjusted player avatar.

FIG. 8 illustrates an example embodiment of a skeletal model 808 representing a scanned human target used to track a user, such as user 18 or 1002. The model is shown relative to the user 1002. According to an example embodiment, the skeletal model 808 may include one or more data structures that may represent the human target 18 or 1002 as a three-dimensional model. Each body part may be characterized as a mathematical vector defining joints and bones of the skeletal model 808.

As shown in FIG. 8, the skeletal model 808 may include one or more joints n1-n18. According to an example embodiment, each of the joints n1-n18 may enable one or more body parts defined there between to move relative to one or more other body parts. For example, a model representing a human target may include a plurality of rigid and/or deformable body parts that may be defined by one or more structural members such as "bones" with the joints n1-n18 located at the intersection of adjacent bones. The joints n1-n18 may enable various body parts associated with the bones and joints n1-n18 to move independently of each other. For example, the bone defined between the joints n7 and n11, shown in FIG. 9, corresponds to a forearm that may be moved independent of, for example, the bone defined between joints n15 and n17 that corresponds to a calf.

**Each of the joints represents a place in the skeleton where the skeleton can pivot in the x, y, z directions or a place of interest on the body. Other methods for tracking can also be used. Suitable tracking technology is disclosed the teachings of U.S. patent application Ser. Nos. 12/475,308, 12/696,282, 12/641,788, and 12/575,388, cited above.

Figure 9:
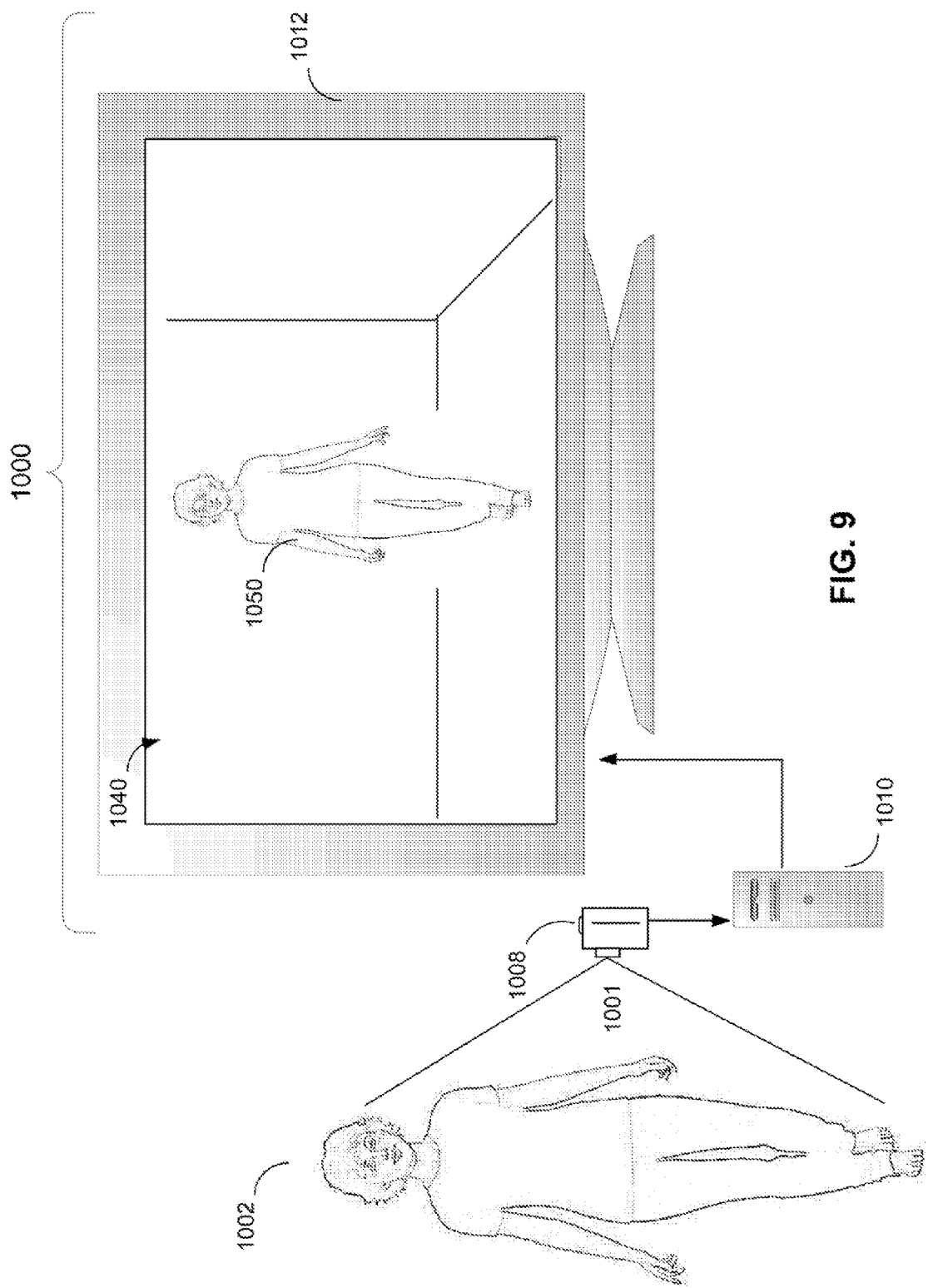
FIG. 9 illustrates a user 1002 and an on-screen representation of the user 1050 provided by system 20.

FIG. 9 illustrates a user 1002 and an on-screen representation of the user 1050 provided by system 20. Through moving her body, a user 1002 may create gestures. A gesture comprises a motion or pose by a user that may be captured as image data and parsed for meaning.

A user's gestures may be used for input in a general computing context. For instance, various motions of the hands or other body parts may correspond to common system wide tasks such as navigate up or down in a hierarchical list, open a file, close a file, and save a file. For instance, a user may hold his hand with the fingers pointing up and the palm facing the capture device 20. He may then close his fingers towards the palm to make a fist, and this could be a gesture that indicates that the focused window in a window-based user-interface computing environment should be closed. Gestures may also be used in a video-game-specific context, depending on the game. For instance, with a driving game, various motions of the hands and feet may correspond to steering a vehicle in a direction, shifting gears, accelerating, and braking. Thus, a gesture may indicate a wide variety of motions that map to a displayed user representation, and in a wide variety of applications, such as video games, text editors, word processing, data management, etc.

An application may set values for parameters associated with various transition points to identify the points at which to use pre-canned animations. Transition points may be defined by various parameters, such as the identification of a particular gesture, a velocity, an angle of a target or object, or any combination thereof. If a transition point is defined at least in part by the identification of a particular gesture, then properly identifying gestures assists to increase the confidence level that the parameters of a transition point have been met.

Figure 10:
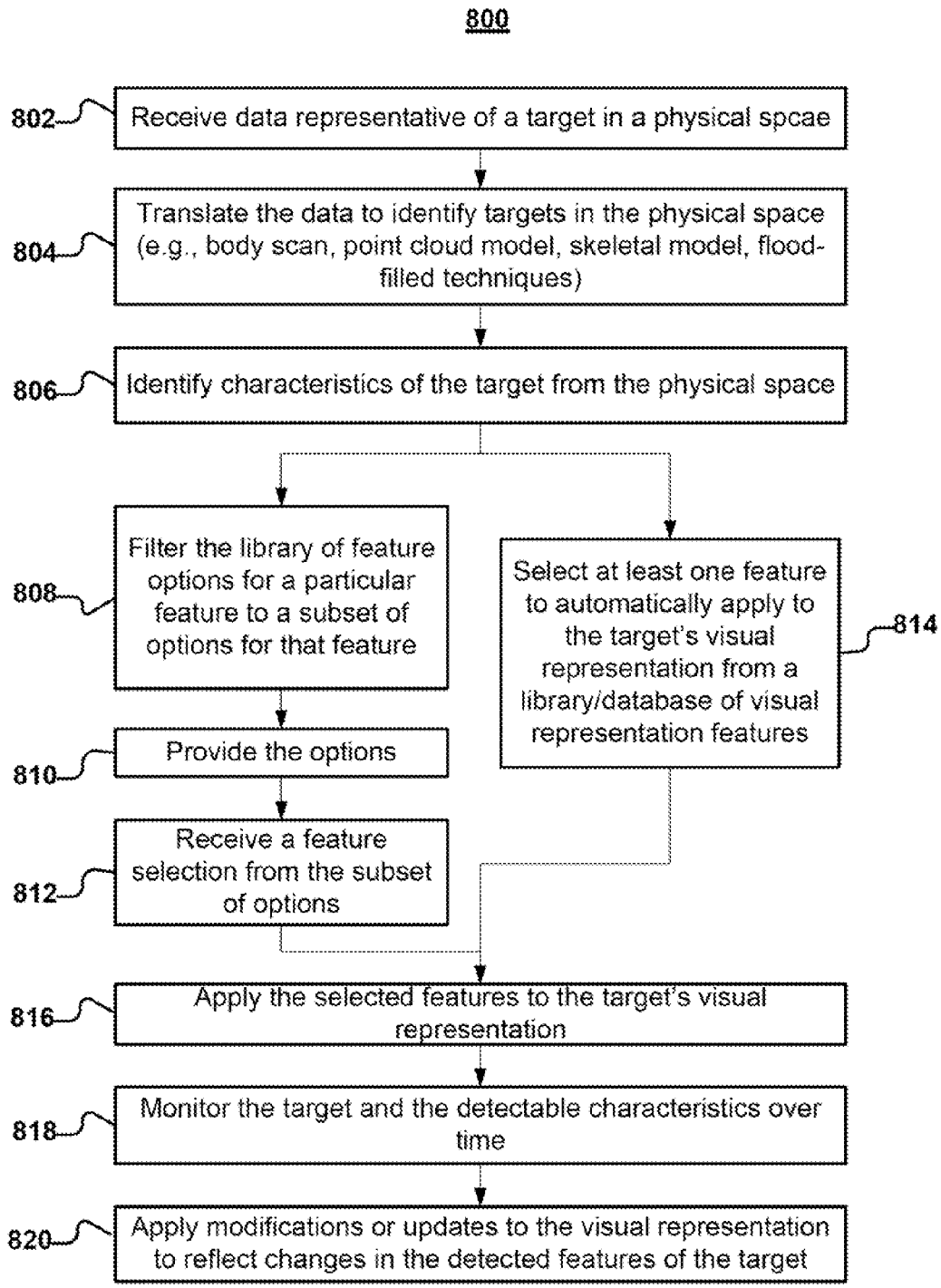
FIG. 10 is a flowchart illustrating a method for creating an on-screen representation of a human target.

FIGS. 9 and 10 illustrate the creation of an on screen representation 1050 of a user 1002. The techniques for generating an on-screen representation are disclosed in U.S. patent application Ser. No. 12/511,850, entitled Auto Generating a Visual Representation, filed 29 Jul. 2009, fully incorporated herein by reference. The on-screen representation may be auto-generated by the system to provide a visual representation of a target that has features resembling the detected features of the target. Alternately, the system may provide a subset of selectable features from which the user may choose. The system may select the features based on the detected features of the target and apply the selections to the visual representation of the target. Thus, auto-generation techniques may remove a large amount of the effort from a user. For example, the system can make selections, on behalf of the user, and apply them to the user's visual representation.

As shown in FIG. 9, the system renders a visual representation 1050 on a display 1000 that corresponds to the user 1002 in the physical space 1001. In this example, the system auto-generated the on-screen representation 1050 by detecting features of the user 1002, comparing the detected features to a library of feature options, or imaging information in an imaging library, selecting the feature options that resemble the detected features of the user 1002, and automatically applying them to the user's on-screen representation 1050. The auto-generation of the on-screen representation removes work from the user 1002 and creates an experience for the user 1002 as they are transported into the game or application experience.

By tracking the model generated at step 408, system 20 can display the on-screen representation in real time and update the feature selections applied to the on-screen representation in real time. The system may track the user in the physical space over time and apply modifications or update the features applied to the on-screen representation, also in real time. For example, the system may track a user and identify that the user has removed a sweatshirt. The system may identify the user's body movements and recognize a change in the user's clothing type and color. The system may use any of the user's identified characteristics to assist in the feature selection process and/or updated the features selected from the features library and applied to the visual representation.

Image data and/or depth information may be used in to identify target features. Such target features for a human target may include, for example, height and/or arm length and may be obtained based on, for example, a body scan, a skeletal model, the extent of a user 1002 on a pixel area or any other suitable process or data. Using for example, the depth values in a plurality of observed pixels that are associated with a human target and the extent of one or more aspects of the human target such as the height, the width of the head, or the width of the shoulders, or the like, the size of the human target may be determined. The camera 1008 may process the image data and use it to determine the shape, colors, and size of various parts of the user, including the user's hair, clothing, etc. The detected features may be compared to a catalog of feature options for application to a visual representation, such as the visual representation feature options in the features library 197.

In another example embodiment, the system can identify characteristics of the user and use the identified characteristics to select features for the visual representation, the system may use target digitization techniques. The techniques comprise identifying surfaces, textures, and object dimensions from unorganized point clouds derived from a capture device, such as a depth sensing device. Employing target digitization may comprise surface extraction, identifying points in a point cloud, labeling surface normals, computing object properties, tracking changes in object properties over time, and increasing confidence in the object boundaries and identity as additional frames are captured. For example, a point cloud of data points related to objects in a physical space may be received or observed. The point cloud may then be analyzed to determine whether the point cloud includes an object. A collection of point clouds may be identified as an object and fused together to represent a single object. A surface of the point clouds may be extracted from the object identified.

Any known technique or technique disclosed herein that provides the ability to scan a known/unknown object, scan a human, and scan background aspects in a scene (e.g., floors, walls) may be used to detect features of a target in the physical space. The scan data for each, which may include a combination of depth and RGB data, may be used to create a three-dimensional model of the object. The RGB data is applied to the corresponding area of the model. Temporal tracking, from frame to frame, can increase confidence and adapt the object data in real-time. Thus, the object properties and tracking of changes in the object properties over time may be used to reliably track objects that change in position and orientation from frame to frame in real time. The capture device captures data at interactive rates, increasing the fidelity of the data and allowing the disclosed techniques to process the raw depth data, digitize the objects in the scene, extract the surface and texture of the object, and perform any of these techniques in real-time such that the display can provide a real-time depiction of the scene.

Camera recognition technology can be used to determine which elements in the features library 197 most closely resemble characteristics of the user 602. The system may use facial recognition and/or body recognition techniques to detect features of the user 1002. For example, the system may detect features of the user based on the generation of the models from the image data, point cloud data, depth data, or the like. A facial scan may take place and the system may process the data captured with respect to the user's facial features and RGB data. In an example embodiment, based on the location of five key data points (i.e., eyes, corner points of the mouth, and nose), the system suggests a facial recommendation for a player. The facial recommendation may include at least one selected facial feature, an entire set of facial features, or it may be a narrowed subset of options for facial features from the features library 197. The system may perform body recognition techniques, identifying various body parts/types from a body scan. For example, a body scan of the user may provide a suggestion for the user's height. For any of these scans, the user may be prompted to stand in the physical space in a position that provides for the best scan results.

Other features may be detected from the captured data. For example, the system may detect color data and clothing data by analyzing the user and/or the model of the user.

The system may detect at least one of the user's features and select a feature from the features library 197 that is representative of the detected feature. The system may automatically apply the selected feature to the user's visual representation 1050. Thus, the user's visual representation 1050 has the likeness of the user as selected by the system.

FIG. 10 shows an example method of providing feature selections to a user. The provision of feature selections may be provided by a display of the visual representation with the features applied or a subset of the library of features with a narrowed down subset of options from which the user may choose. For example, at 802, the system receives data from a physical space that includes a target, such as a user or a non-human object.

As described above, at 802 a capture device can capture data of a scene, such as the depth image of the scene and scan targets in the scene. At 804, the system may determine whether one or more targets in the scene corresponds to a human target such as a user. For example, to determine whether a target or object in the scene corresponds to a human target, each of the targets may be flood filled and compared to a pattern of a human body model. Each target or object that matches the human body model may then be scanned to generate a skeletal model associated therewith. For example, a target identified as a human may be scanned to generate a skeletal model associated therewith. The skeletal model may then be provided to the computing environment for tracking the skeletal model and rendering a visual representation associated with the skeletal model. At 804, the system may translate the captured data to identify the features of the targets in the physical space by using any suitable technique, such as a body scan, point cloud models, skeletal models, flood-filled techniques, or the like.

At 806, the system may detect characteristics of the target and compare them to feature options, such as feature options in a features library. The feature options may be a collection of options for various features for the target. For example, feature options for a user may include eyebrow options, hair options, nose options, etc. Feature options for furniture in a room may include size options, shape options, hardware options, etc.

In an example embodiment, the system may detect several features available for application to the visual representation that resemble the user's detected features. Thus, at 806, the system may detect a feature of the user compare the detected feature to the features library 197 for application to the user's visual representation, and, at 810, the system may select a subset of the feature options based on the detected feature. The system may select the subset as those features by comparing the similarities of the features in the features library 197 to the detected characteristics of the user. Sometimes, a feature will be very similar, but the system may still provide the user a subset of options to choose from at 810. In this manner, the user can select a feature from the subset that is at least similar to the user's corresponding characteristic, but can select a more flattering feature from that subset, for example. The system may receive the user's selection from the subset of options at 812. Thus, the user does not have to filter an entire library of options for the particular feature for features that are similar to the user. The system can filter the library of options and provide the user a subset of features from which to choose.

The system may auto-generate a visual representation of the user at 814. Thus, upon comparison of the target's detected features to the options in the features library, the system may auto-generate a visual representation of the target by automatically selecting the features to apply to the visual representation. The target is effortlessly transported into the system or software experience when the system automatically renders a visual representation that corresponds to the user, having automatically selected features from the features library that resemble the detected features of the target.

The visual representation may have a combination of automatically selected features and features selected by the user based on the subset of options provided by the system. Thus, the visual representation may be partially generated and partially customized by the user.

The selections made by the system and/or the user may be applied to the target's visual representation at 816. The system may render the visual representation to the user. At 818, the system may continue to monitor the target in the physical space, tracking the detectable features of the target over time. Modifications to the target's visual representation may be made in real time to reflect any changes to the target's detected features. For example, if the target is a user and the user takes off a sweatshirt in the physical space, the system may detect a new shirt style and/or color, and automatically select an option from the features library that closely resembles the user's shirt.

The selected option may be applied to the user's visual representation in real time. Thus, the processing in the preceding steps may be performed in real time such that the display corresponds to the physical space in real time. In this manner, an object, a user, or motion in the physical space may be translated for display in real time such that the user may interact with an executing application in real time.

The user's detected features, the selected features by the system, and any selected features by the user may become part of a profile, at 822. The profile may be specific to a particular physical space or a user, for example. Avatar data, including features of the user, may become part of the user's profile. A profile may be accessed upon entry of a user into a capture scene. If a profile matches a user based on a password, selection by the user, body size, voice recognition or the like, then the profile may be used in the determination of the user's visual representation. History data for a user may be monitored, storing information to the user's profile. For example, the system may detect features specific to the user, such as the user's facial features, body types, etc. The system may select the features that resemble the detected features for application to the target's visual representation and for storage in the target profile.

Elements of the on-screen representation and the skeletal model, when combined, provide a 3-D model of the user which can be used when applying articles such as clothing to the user. In order to provide an accurate virtual representation of how an article will interact with the user, sizing information for the user to allow connection of a model of a garment is maintained with the 3-D model.

As noted above, the detection, imaging and tracking components of system 20 may be utilized in an on-line presentation and shopping application. The presentation and shopping application 180 provides a user with a realistic idea of how articles presented in an on-screen representation will appear relative to the user or a scene that the user specifies.

Figure 11:
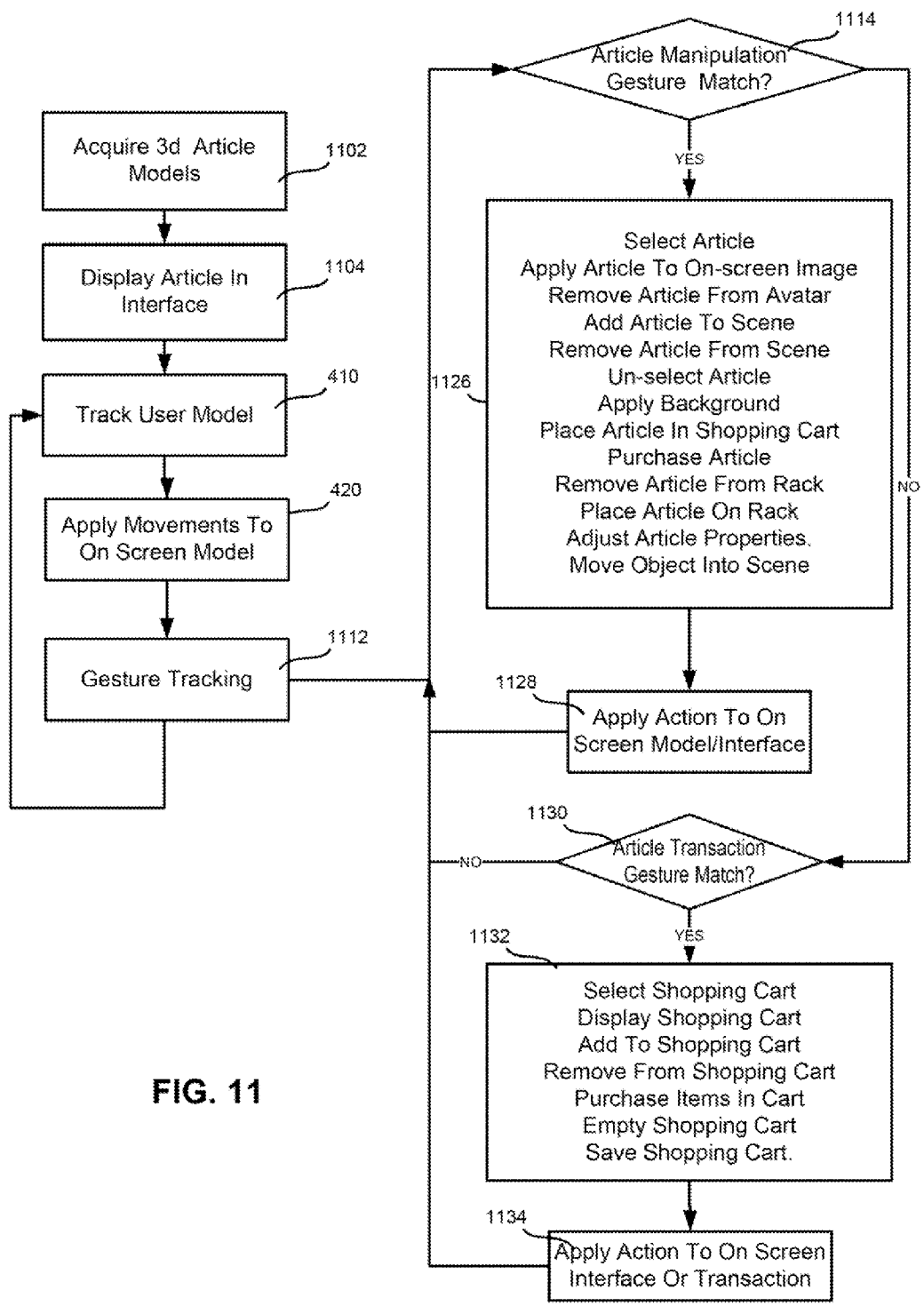
FIG. 11 is a flowchart illustrating a method performed by a computer to implement an on-screen shopping application.

FIG. 11 illustrates a process performed by a presentation and shopping application in accordance with the present technology.

At step 1102, three dimensional article models are acquired by the system 20. Articles are virtual elements used in the shopping application which represent real-world goods be available from online or retail vendors. Article models may be acquired from a variety of sources. Retailers wishing to present articles for sale using the shopping application may create their own article models consistent with one or more standards for three dimensional models. Model specifications may fit any number of known standards for creating and storing three dimensional models of articles used within a rendered scene. Vendors may provide pricing and transaction information associated with the article model.

At 1104, the article is displayed in an application interface. Exemplary interfaces are shown in FIGS. 12-19. Next, at steps 410 and 420, the user model is tracked and movements applied to the on-screen model, respectively. Steps 410 and 420 are equivalent to those set forth above with respect to FIG. 5.

At 1112, the gesture recognition engine 192 monitors the scene information for gestures within the movements of the user model at 410 which might indicate that the user intends an action to take place. One type of action may comprise an article manipulation gesture, where a user wishes to move an article within the scene relative to the on-screen model. If an article manipulation gesture is found, a gesture match at 1114 occurs, and any one of a number of gestures such as those illustrated in FIG. 11 may occur.

Step 1126 illustrates a small set of possible gestures representing an action which may occur in an shopping application 180. These actions may include, for example, an action to: select article, apply article to on-screen image, remove article from avatar, add article to scene, remove article from scene, un-select article, apply background, remove article from rack, place article on rack, adjust article properties, and move object into scene. The aforementioned gestures should not be construed as limiting but are exemplary of the type of gestures a user may need in a shopping application when manipulating an article.

Selecting an article may comprise a gesture indicating that that the user intends to select an article in the interface. An interface for the application may be presented in a display, as shown below at FIG. 12. Selection can be of an article in a rendered scene or in the interface selection portion of the scene. Such a gesture may comprise, for example, a motion to grab a virtual garment by moving to position the on-screen representation of the user's hand over the garment and closing one's hand. A gesture applying an article to an on-screen image may comprise moving a selected garment from a rack of hanging virtual clothes, and placing the garment on top of the on-screen representation. Conversely, a gesture may comprise removing an article. A gesture may indicate the user wishes to adjust the clothing. For example, the user may wish to raise the user's collar, roll up the user's pants, roll up the user's sleeves, or the like. Any of these types of gestures may result in the adjustment of the clothing in the interface at 1128. Alternatively, the user may wish to place themselves in a different physical background at 1128. A gesture such as selecting a background tile from the interface and applying the background tile into the user's screen will result in applying or removing a background at 1128. Any other of a number of types of actions at 1126 may result in a corresponding action 1128 within the interface.

Another general type of gesture which may be initiated by a user is a transaction gesture. A transaction gesture may be used by the user to initiate a purchase, return or other type of transaction on a real-world article represented by the virtual article in the interface. if an article transaction gesture is recognized at 1130, any of a number of actions may occur at 1132, including an action to: select shopping cart, display shopping cart, add to shopping cart, remove from shopping cart, purchase items in cart, empty shopping cart, save shopping cart, purchase an item from the interface, add funding information, retrieve stored funding information, or any other transaction related action. When the action occurs at 1132, a representation of the action may be rendered in the display at 1134. Rendering a transaction action in the display may take any number of known forms used to conduct computer based purchase transactions.

Figure 12:
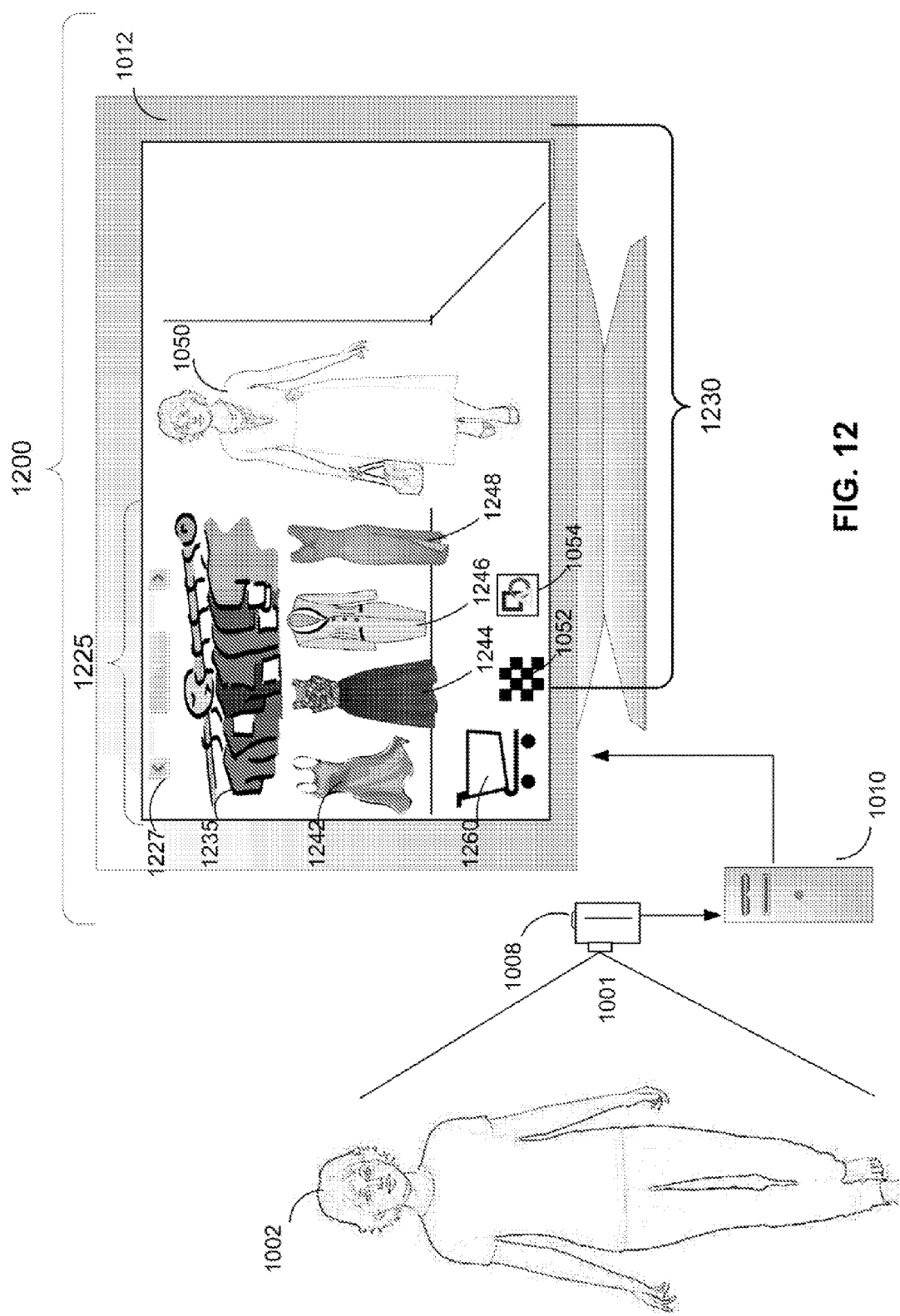
FIG. 12 is a representation of an on-screen representation of a user and a user interface.

FIG. 12 illustrates an exemplary interface 1200 which is rendered by the system based on a human model 1002. The interface 1200 may include a control or selection portion 1225 and a rendered scene 1230. In one embodiment, control elements, such as a scroll bar 1227, a garment rack with selectable garments 1235, and a shopping cart 1260 may be provided in the selection portion 1225 of a rendered scene. Actions of the human model 1002 are transferred to the on-screen representation 1050. The interface may include, for example, virtual articles comprising a virtual rack of clothes 1040, and/or individual garments 1042, 1044, 1046, 1048, and a series of backgrounds 1052, 1054, any number of which may be provided to the user. The user 1002 facing the screen 1200 can reach up, grasp the garment from a rack, place it in an array of garments 1060 and/or place the garment onto the virtual model 1050. As indicated in FIG. 12, the appearance of the virtual model 1050 will mimic the size of the user 1002 with the appropriate clothing articles attached.

In using the interface 1200, a user 1002 may make appropriate gestures to select garments from a garment rack 1235, place them in a holding area (garments 1242, 1244, 1246 and 1248) and move the garments onto the virtual model 1050. A user 1002 may use a scroll interface 1227 to move through garments on a virtual rack 1235. A user may select to put garments into a virtual shopping cart 1260 which a user may then purchase using a transaction interface (not shown). Purchasing items using the system may comprise using a purchasing interface provided by system 20 which a user 1002 may interact with using gestures, or may comprise being provided with a vendor specific interface through, for example, a browser window presented in the interface 1200.

Figure 13:
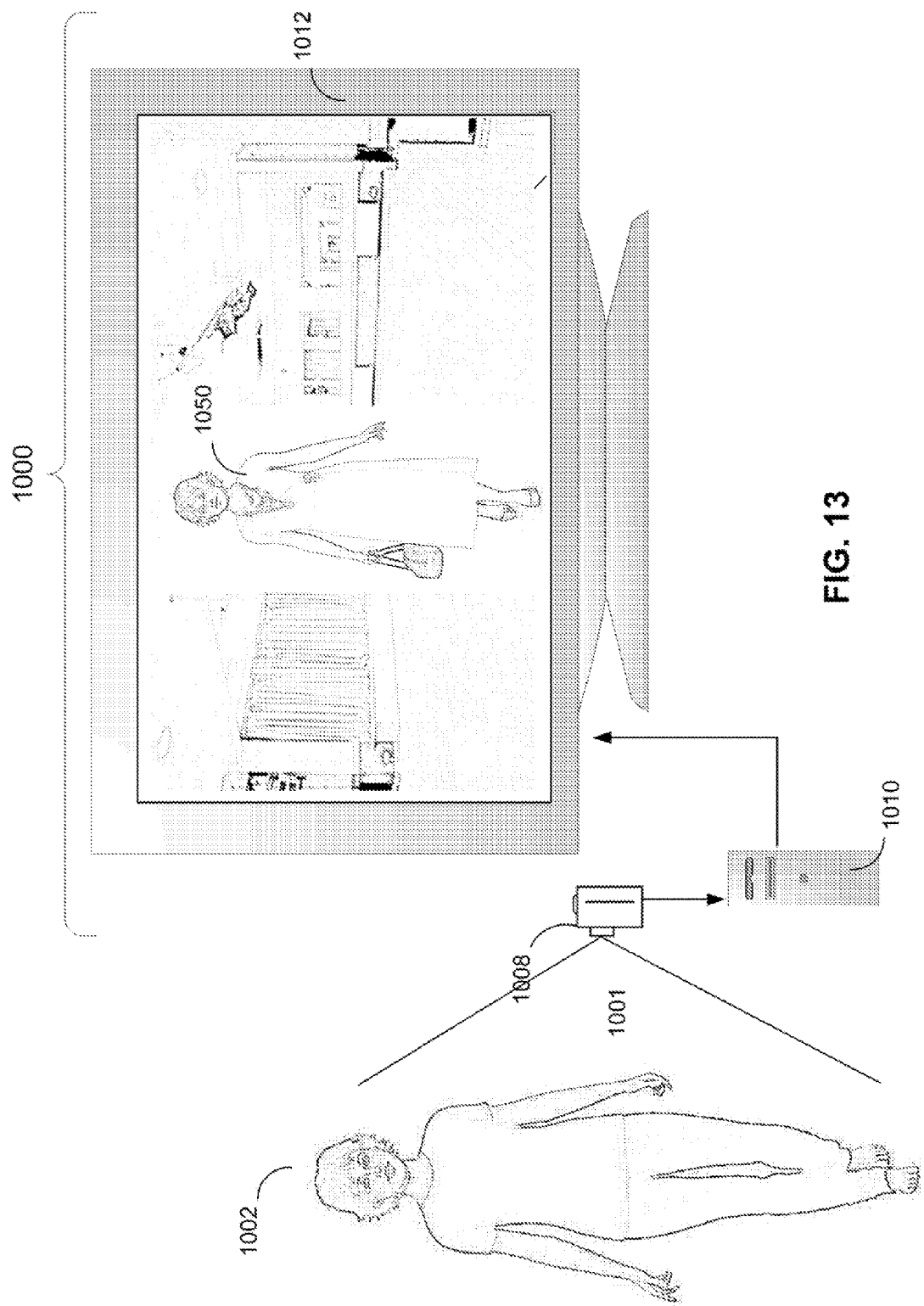
FIG. 13 is a representation of an on-screen representation of a human target user in a virtual background.

A user may select one or more of the background icons 1052, 1054 to provide a scene specific background behind the virtual representation 1050 of user 1002. FIG. 13 illustrates the application of a background to the scene illustrated in FIG. 12. In the application of FIG. 13, other elements of the interface have been removed, but in other applications the elements of the interface 1025 may remain. When the background is applied to the scene, the selection portions of the interface may by removed. Alternatively, the selection portions may be displayed. When the selection portions are not displayed. Application of a background 1052, 1054 allows the user to determine how a particular article will appear in a particular situation.

Backgrounds 1052, 1054 may comprise scanned scenes stored by the user using the capture device 20, or stock scenes provided by retailers or third parties. In one embodiment, the interface presents the user in the scene presented to the capture device. Other stored scenes may be utilized and selected by the user in the interface.

Other interface elements may be provided to allow the user to change the appearance of the on-screen representation. For example, lighting controls may allow a user to change the type and position of lighting sources on a scene. Certain articles, such as lamps, may include, in metadata associated with the model, information to allow the system to generate a light source from the article to allow a user to determine how source light from the lamp will change the appearance of a scene. Each of the elements may be represented within the interface by suitable on-screen controls.

Another interface element may include user sizing controls. Sizing controls may be applied to articles (such as clothing) or to the representation of the tracked human model of the user. For example, a user may wish to determine how her appearance may change with a gain or loss of weight. Sizing controls may also allow selection of different sizes of articles, allowing a user to determine if a small or medium size article fits the on-screen representation better.

Figure 14:
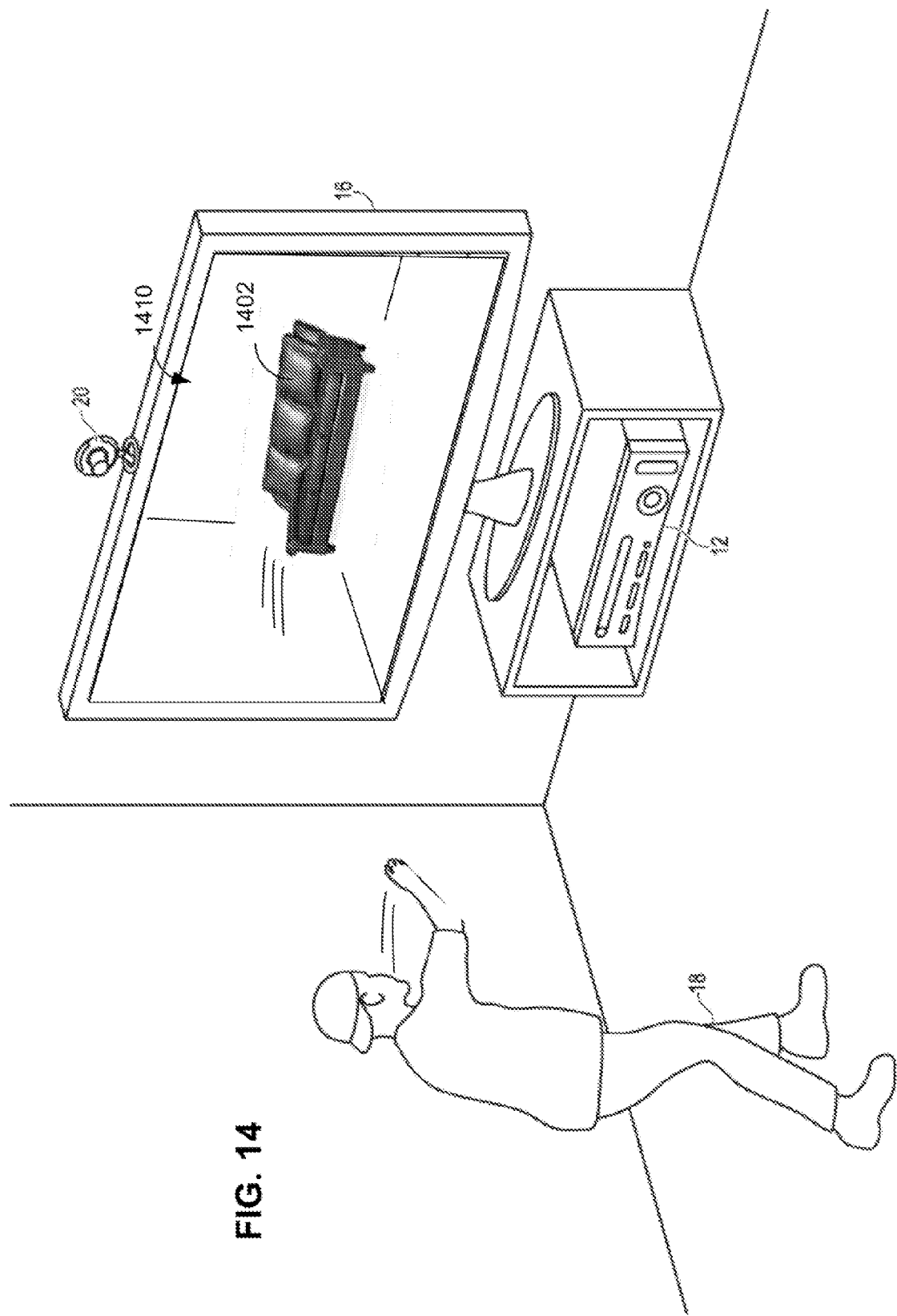
FIG. 14 is an example embodiment of a tracking system implementing a shopping application using virtual articles.

FIG. 14 illustrates an alternative use of the shopping application or in a user 18 can place physical object, such as a couch 1402, within a scene 1410 on a display 16. In different embodiments, different types of virtual articles other than clothing or furniture may be presented in by the shopping application 180.

Figure 15:
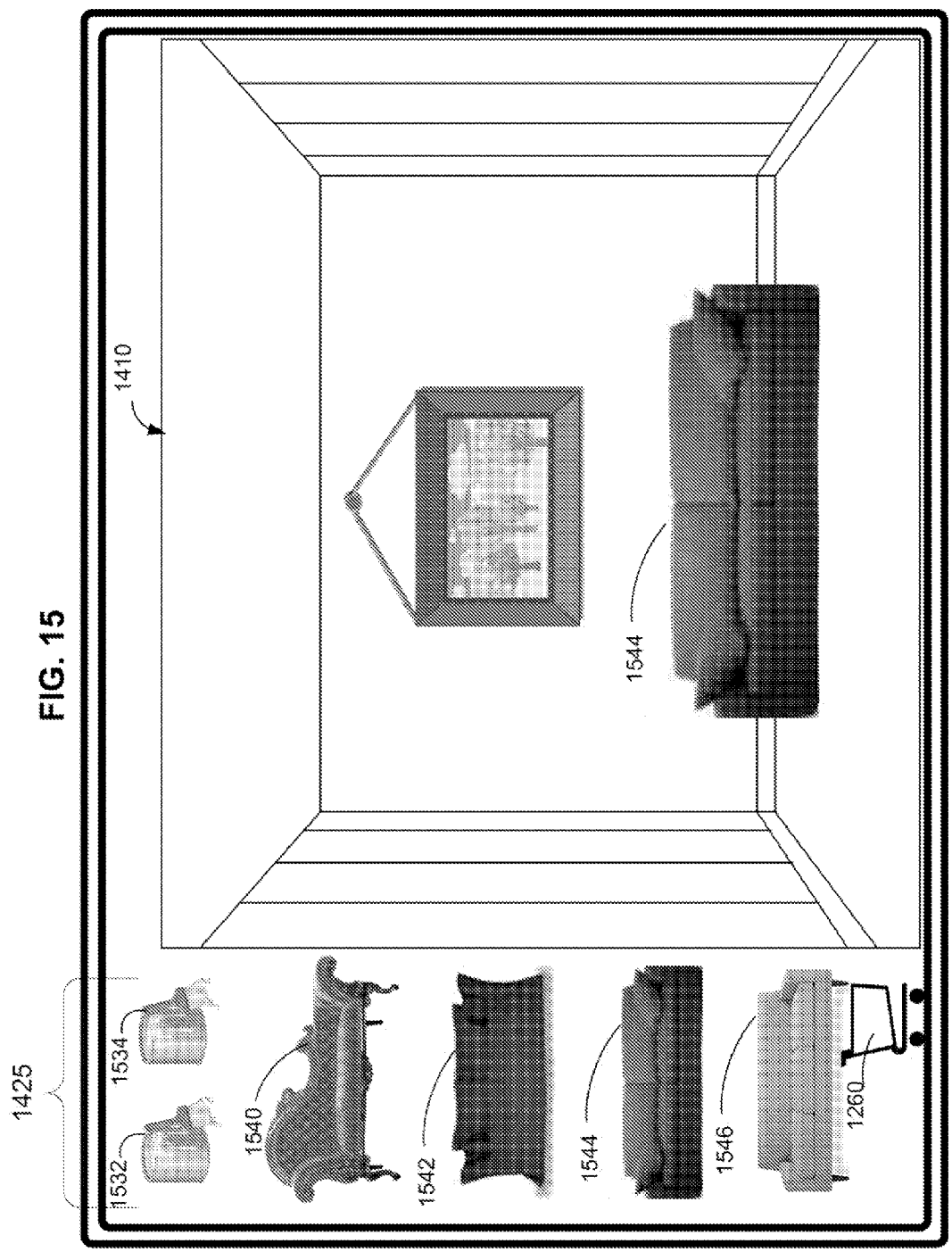
FIG. 15 is a representation of an on-screen interface without a human target in a virtual scene.

FIG. 15 is an enlarged view of an exemplary scene 1410 provided with an interface 1425 suitable for use with a shopping application used in a room modeling application. Interface 1525 includes, for example, a number of articles (in this example chairs) 1540, 1542, 1544 and 1546 as well as a number of paint colors 1532 and 1534 which can be applied to a scene 1410.

Scene 1410 may be a representation of a user's room or the scene scanned by the capture device 20 (or another background selected by the user). Elements within the scene which are determined to be objects can be removed from the scene, or can be replaced in the scene by other objects through motions of the user. For example, if a user 1002 reaches on an article such as article 1544 and grasps the article and moves it into the scene, the user can position the article within the scene 1410 at a desired location by grasping the article with a hand closing motion, and releasing the article with a hand opening motion. Similarly, the user can paint the room by grasping one of the two icons 1532 and 1534, and applying that to the scene 1550. Any number of different types of articles may be provided from third-party vendors.

Scene 1410 may be created by scanning the user's environment (such as area 1001 in FIG. 9). Scene 1410 will maintain the perspective of the room as well as sizing information to allow articles presented therein to have the proper size in relation to the scene. Gestures specific to a presentation and shopping application may be used. For example, if an article is a rug and the user wishes to place a rug under the chair, as opposed to in front a chair, a specific gesture allows for positioning of the rug relative to the chair 1544.

In another alternative, the shopping application 180 may provide an interactive experience between two users (User A, User B) using different systems 20 or two users in a scene using a direct connection between two computing environments 12A and 12B or a networked connection between the devices.

Figure 16:
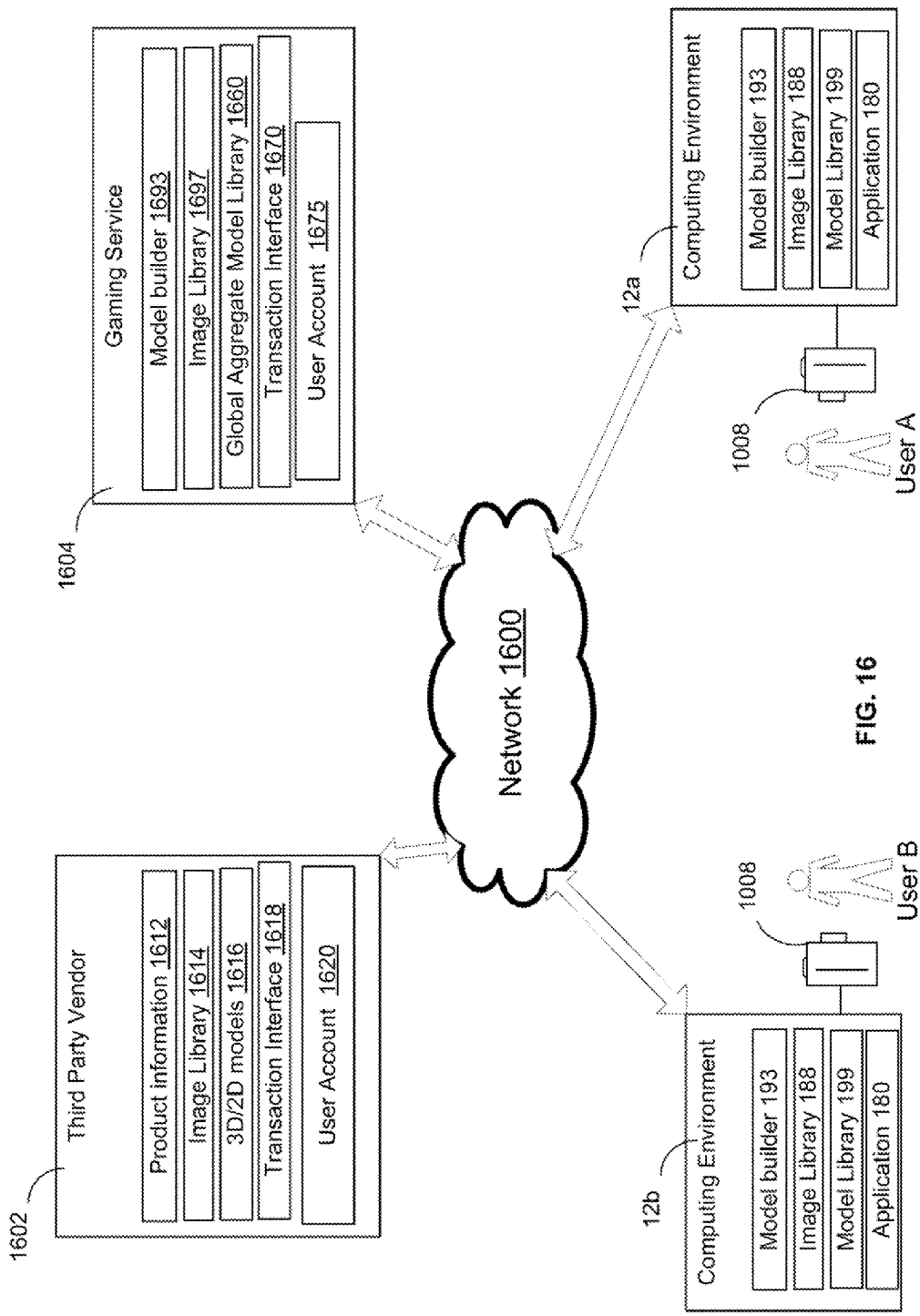
FIG. 16 is a block diagram depicting various tracking systems connected via a network with on-line retailers and a gaming service.

FIG. 16 illustrates an overview of interconnected systems which may be used to provide services to a shopping application on one or more computing commuting environments 12A and 12B. Computing environments 12A and 12B may be coupled to a gaming service 1604 and one or more third-party vendor sites 1602 via a network 1600. A subset of elements equivalent to those illustrated with respect to each computing environment 12 shown in FIG. 2 are shown in FIG. 16 for illustration only. However, it should be understood that other elements 190, 191, 192, 194, 195, 196, 198 may be provided on environments 12A and 12B.

The third-party vendor sites may comprise vendors having articles for sale to users and who interact directly with computing environments 12A, 12B or interact with gaming service 1604 to allow users operating shopping application 180 to purchase goods using application 180. In one embodiment, vendors 1602 can supply 3-D models, or 2-D product information on articles available from the vendors directly to the computing environments 12A, 12B. Metadata attached to the models or information may include sizing information, pricing information and purchase terms. Application 180 may support interfacing directly with product information 1612, an image library 1614, models 1616 and a transaction interface 1618 provided by vendor 1602.

Gaming service 1604 may include a global aggregate library of 3-D models gathered from a variety of different vendors 1602 allowing users to access an aggregated set of available items via a single service. Likewise, article models may be provided to the gaming service 1604 which can store 3-D models that may be aggregated by the gaming service 1604 for use on a plurality of computing environments 12. A gaming service may provide its own 3-D models, or 3-D models may be generated by the computing environment itself. In addition, gaming service 1604 may maintain user account information 1675 including financial payment information to allow users to purchase items directly from the gaming service or where the service 1604 acts as an intermediary between the user and vendors 1602. A transaction interface 1670 in the gaming service communicates via network 1600 with a transaction interface 1618 to enable purchases by users to vendors through the gaming service 1604.

Alternatively, vendors maintain user account information 1620 to allow computing environments 12A and 12B to couple to the vendor directly and initiate purchase transactions with the vendor directly.

Figure 17:
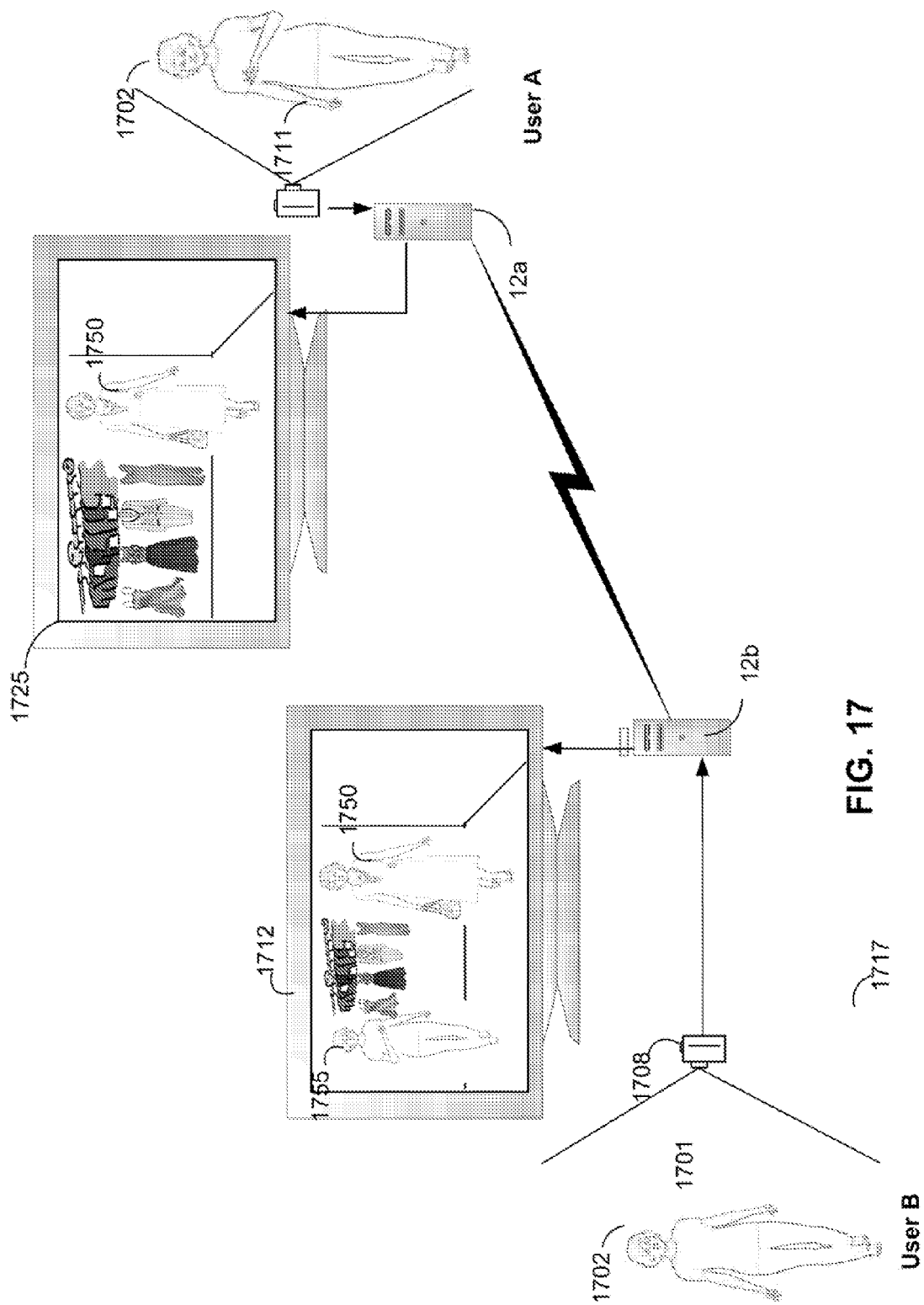
FIG. 17 is a block diagram depicting various tracking systems connected via a network.

In another alternative, two users can communicate and collaborate via a networked environment in the shopping application 180. As illustrated in FIGS. 17 an 18, two users A and B using different computing environments, each executing an application 180 can interact allowing, for example, user A to apply changes to the on-screen representation of user B. In FIG. 17, an on-screen representation 1750 of user B (1702) is generated and represented in a display 1712 along with an on-screen representation 1755 of user A (1704). User A, interacting with computing environment 12A, may interact with interface 1725 to select articles to be applied to the on-screen representation 1750 of user B, which are then displayed to user B in her interface 1712. Movements of user B within her environment 1701 are displayed to user B such that both users view the same scene. Should user B wish to change the scene, her actions are transmitted back to the display 1722 of User A.

Figure 18:
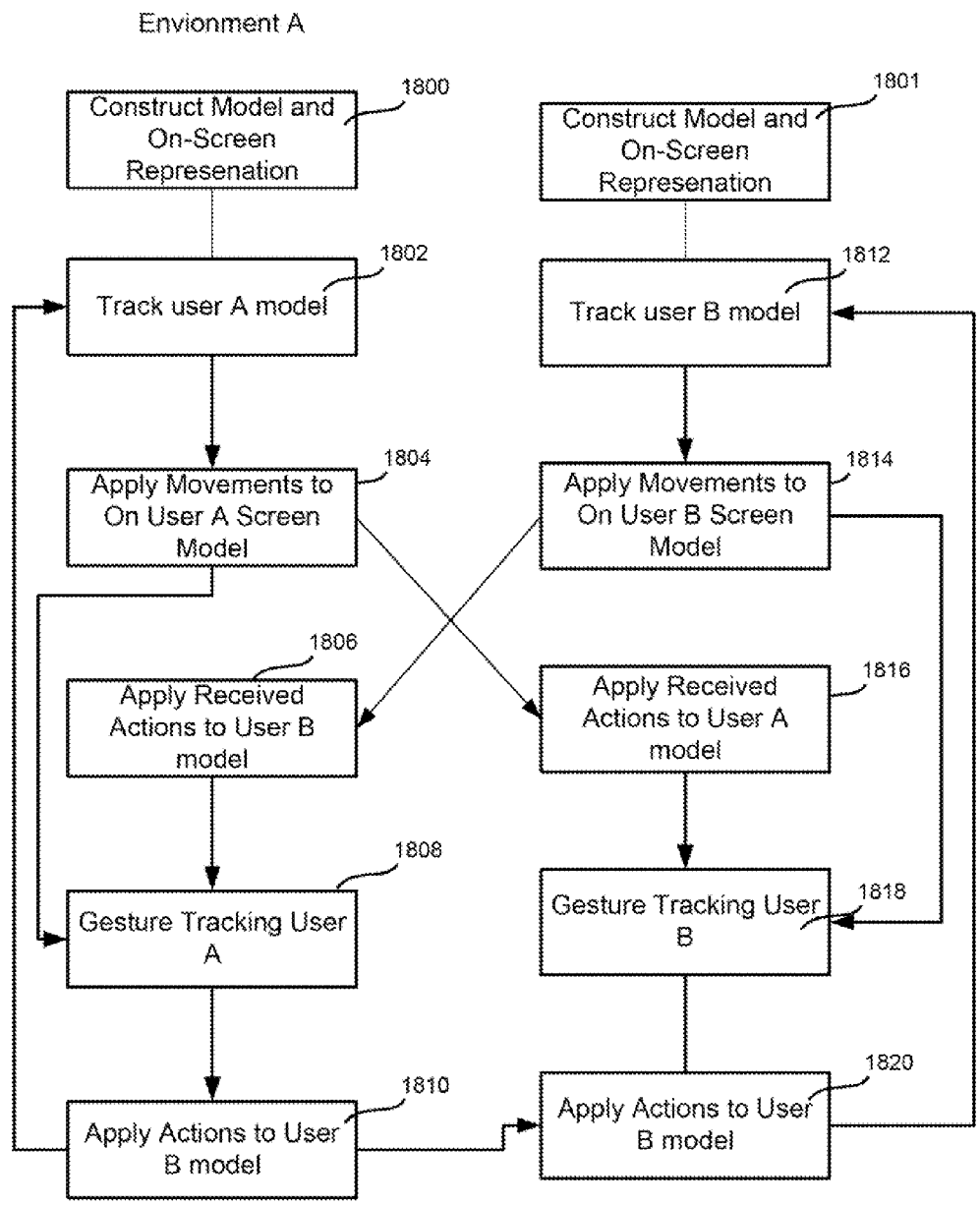
FIG. 18 is a flowchart illustrating how two users on different systems may interact using in an on-screen shopping application.

This process is illustrated in FIG. 18. FIG. 18 illustrates the process of the application 180 operating on two different processing devices 12A and 12B. Respective on-screen models for User A and user B are generated at 1800 and 1801, respectively. At step 1802, actions of User A are tracked at applied to the on-screen model of user A at 1804. These actions are transmitted to computing environment 12B and applied to an the on-screen model of User A at 1816. Likewise, movements of user B are tracked at 1812, applied to the on-screen representation of User B at 1814 and transmitted to computing environment 12A to be applied to the on-screen representation of User B at 1806. Respective gestures of each user are detected at 1808 and 1818. In this example, actions of user A at 1810 are applied to the User B model and sent to computing environment 12B to be applied to the on-screen representation of the user B model at 1820. However, in alternative embodiments, gestures of user A can likewise be applied to user B.

As noted above, on-screen representations of humans can be provided and likewise, on-screen representations of articles utilized in the method of FIG. 18.

In this manner the respective users can alter each other's interfaces, models, rendered scene or any element of the on-screen display. In alternative embodiments, two users represented in FIGS. 17 and 18 may be connected directly through a network, connected through the internet directly, or connected through an intermediary service such as the gaming service 1604. Any of a number of different types of applications can be used in accordance with the present technology. The technology allows for the personal adaptation of the virtual environment to the user's existing environment in appearance.

Gestures do not have to be drag and drop. They could be more organic to what the user is doing, such as, for example, putting on clothes, or remove clothes. Virtual objects are not limited to clothes that include make-up and other objects.

In addition, suggestion logic may be employed to scan the user's appearance and suggest additional types of virtual objects which can be related to real physical objects which are available by a user. The system can be utilized in home or in a store. Meta data can be attached to the object to help in elemental determinations, such as whether the object fits tightly, or fits loosely. In addition, objects can be overlaid on other objects to determine, for example, how an object fits in a room, or how a shirt interacts with an existing pair of pants. Real time data can be extracted to 3-D in real time or a picture can be cut from the scene and manipulated within the scene.

The system may recommend clothing for the user based on the identity of these user characteristics. The clothing recommendations may be based on clothing in the user's closet or from clothing available for purchase in the virtual world marketplace. For example, a user may have a personal closet with a repository of items owned and associated with a particular visual representation. The personal closet may comprise an interface for allowing the user to view and modify clothing and other items that are applied to the user's visual representation. For example, accessories, shoes, etc, may be modified. A user's gender may be determined based on the captured data or as a result of accessing a profile associated with the user.

Another alternative user of the technology allows a user to interact with an on-screen representation of another user or avatar. As illustrated in FIG. 19, a user 1902 may have an on-screen representation 1950 which represents a different individual. In the example shown in FIG. 19, a female user 1902 may interact with a male on-screen representation. The on-screen representation may be provided from stored profile information of other users or from a library of models. Actions of the user 1902 can be mimicked by the on-screen representation or the model may be posed by the user 1902 based on gestures performed by the user 1902.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A computer implemented method of presenting an interface on a display device, the method implemented by a computer coupled to a capture device, comprising:
   capturing a scene using the capture device by creating depth images of the scene and RGB data, the scene including a human target;
   rendering by the computer of a representation of the scene and a visual representation of the human target based on a skeletal model based on the depth images and the RGB data;
   presenting the interface on the display device allowing the human target to select and position one or more of a plurality of virtual articles representing real articles available for purchase, in the representation on the display device, each of the one or more of the plurality of virtual articles defined by a three dimensional model;
   tracking, by the computer, of movements of the human target in the scene using depth information from the depth images, the depth information provided by the capture device to the computer; and
   responsive to said tracking of movements, the computer altering the rendering of the representation of the scene and the visual representation on the display device by mimicking movement of the human target in the visual representation on the display, including:
      applying the movements of the human target causing the visual representation to engage the one or more of the plurality of virtual articles; and
      applying the movements of the human target engaging the one or more of the plurality of virtual articles to place and move the one or more of the plurality of virtual articles when the movements of the human target in the scene indicate an article manipulation gesture; and
      applying the movements of the human target to a purchasing interface to purchase a real article corresponding to the one or more of the plurality of virtual articles when the movements of the human target in the scene indicate an transaction manipulation gesture.

2. The computer implemented method of claim 1 wherein the step of applying movements of the human target includes positioning the one or more of the plurality of virtual articles on the visual representation of the human target responsive to the article manipulation gesture.

3. The computer implemented method of claim 2 wherein positioning the one or more of the plurality of virtual articles on the visual representation of the human target includes applying the movements of the human target to the visual representation of the human target.

4. The computer implemented method of claim 1 wherein the step of applying movements of the human target includes selecting the one or more of the plurality of virtual articles, positioning the one or more of the plurality of virtual articles at a location within the scene and releasing the one or more of the plurality of virtual articles within the scene.

5. The computer implemented method of claim 4 wherein positioning comprises rendering the one or more of the plurality of virtual articles in a representation maintaining proportions of the one or more of the plurality of virtual articles to the visual representation of the human target.

6. The computer implemented method of claim 1 further including the step of receiving three dimensional models of the one or more of the plurality of virtual articles for inclusion in the representation of the scene from third party vendors.

7. The computer implemented method of claim 1 further including generating three dimensional models of the one or more of the plurality of virtual articles from captured information in the scene.

8. The computer implemented method of claim 1 further including generating a representation of the human target by gathering image information and the depth information, and building a mesh model of a body of the human target.

9. The computer implemented method of claim 8 wherein the visual representation of the human target is of a different individual than the human target.

10. A method implemented by a first processing device coupled to a first capture device and a first display device, comprising:
   scanning a first scene using the first capture device to capture information comprising depth images and RGB data for objects in the first scene;
   parsing the information from the first capture device by the first processing device to determine a first human target user in the first scene;
   rendering a virtual representation of the first human target user in the first scene on the first display device, the virtual representation having a likeness of the first human target user and based on a skeletal model derived from the depth images and RGB data;
   presenting one or more virtual articles in the scene on the display device, the one or more virtual articles corresponding to one or more real world articles;
   tracking, by the first processing device, of movements of the first human target user in the first scene responsive to the first capture device and applying said movements to the virtual representation of the first human target user and said one or more virtual articles on the first display device;
   the first processing device recognizing at least one article manipulation gesture of the first human target user responsive to the capture device, the article manipulation gesture indicating an instruction to manipulate at least one of the one or more virtual articles relative to the virtual representation of the first human target user;
   altering the virtual representation on the display device by applying the article manipulation gesture to change the virtual representation;
   recognizing at least one transaction manipulation gesture, the transaction manipulation gesture comprising an instruction to perform a transaction relative to an article corresponding to the one or more virtual articles selected by the first human target user; and applying the at least one transaction manipulation gesture to a purchase transaction.

11. The method of claim 10 further including capturing movements of the first human target user using the first capture device and the first processing device in a first physical location and transmitting said information to a second processing device at a second physical location, the second processing device including a second capture device and a second display device and detecting a second human target at the second physical location, further including rendering a second virtual representation of the first human target user in the first scene on the second display device, the second virtual representation having a likeness of the first human target user;
  presenting the one or more virtual articles in the first scene on the second display device; and
  tracking by the second processing device of movements of the second human target in the second physical location responsive to the second capture device and applying said movements to the second virtual representation of the second human target and the one or more virtual articles in the virtual representation on the first display device.

12. The method of claim 11 wherein the first processing device and the second processing device are coupled by a network.

13. The method of claim 12 wherein the first and second processing devices are coupled to a vendor via the network, and the method further includes the step of:
  providing a purchasing interface, the purchasing interface responsive to a transaction gesture, the transaction gesture initiating a purchase of a real world article corresponding to the one or more of the virtual articles with the vendor.

14. The method of claim 13 further including the step of receiving three dimensional models of virtual articles for inclusion in the virtual representation of the first scene from third party vendors.

15. The method of claim 14 further including generating the visual representation of the first human target user using depth information and building a mesh model of a body of the first human target user.

16. An apparatus, comprising
a capture device including a first memory;
code stored in the first memory configured to instruct the capture device to continuously capture information comprising depth images and RGB data for a scene, the scene including a human target, the depth images including information on the human target;
a processor;
a second memory associated with the processor; and
code stored in the second memory configured to instruct the processor to:
  render a virtual representation of the human target on a display device, including tracking the human target based on a skeletal model derived from the depth images and RGB data, the virtual representation mimicking movement of the human target in the virtual representation on the display;
  present an interface allowing the human target to manipulate virtual articles representing real articles available for purchase relative to the virtual representation on the display;
  alter the virtual representation to apply at least one of the virtual articles to the virtual representation of the human target based on an article model;
  recognize at least one transaction manipulation gesture performed by the human target relative to the at least one of the virtual articles; and
  complete a purchase transaction by applying the at least one transaction manipulation gesture to purchase a real world article corresponding to the at least one of the virtual articles.

17. The apparatus of claim 16, the code stored in the second memory further configured to instruct the processor to render a purchasing interface on the display, the purchasing interface responsive to a transaction gesture which initiates a purchase of a real world article corresponding to the at least one of the virtual articles with a vendor.

18. The apparatus of claim 16, the code stored in the second memory further configured to apply movements of the human target to apply the at least one of the virtual articles on the virtual representation of the human target responsive to an article manipulation gesture.

* * * * *